(12) United States Patent
Hasimoto

(10) Patent No.: US 8,746,994 B2
(45) Date of Patent: Jun. 10, 2014

(54) AUXILIARY DEVICE FOR FULL-CIRCLE PANORAMIC VIDEO IMAGING

(75) Inventor: Norihisa Hasimoto, Yokohama (JP)

(73) Assignee: Japan Science and Technology Agency, Saitama (JP)

( * ) Notice: Subject to any disclaimer, the term of this patent is extended or adjusted under 35 U.S.C. 154(b) by 417 days.

(21) Appl. No.: 13/272,546

(22) Filed: Oct. 13, 2011

(65) Prior Publication Data
US 2012/0033960 A1 Feb. 9, 2012

Related U.S. Application Data

(63) Continuation of application No. PCT/JP2010/057336, filed on Apr. 26, 2010.

(30) Foreign Application Priority Data

Apr. 30, 2009 (JP) ................. 2009-110968
Oct. 26, 2009 (JP) ................. 2009-245221

(51) Int. Cl.
*G03B 17/00* (2006.01)
*H04N 7/00* (2011.01)
*H04N 5/232* (2006.01)

(52) U.S. Cl.
CPC ................. *H04N 5/23238* (2013.01)
USPC ............................ 396/428; 348/36

(58) Field of Classification Search
CPC .................................. H04N 5/23238
USPC ............................ 396/428; 348/36
See application file for complete search history.

(56) References Cited

U.S. PATENT DOCUMENTS

| | | | |
|---|---|---|---|
| 6,027,085 A * | 2/2000 | Ruther | 248/187.1 |
| 6,639,625 B1 | 10/2003 | Ishida et al. | |
| 6,927,905 B1 | 8/2005 | Kashitani et al. | |
| 2010/0254697 A1 * | 10/2010 | Johnson | 396/428 |

FOREIGN PATENT DOCUMENTS

| | | |
|---|---|---|
| JP | 05-188506 | 7/1993 |
| JP | 09-018750 | 1/1997 |
| JP | 11-041510 | 2/1999 |
| JP | 11-046325 | 2/1999 |
| JP | 11-127375 | 5/1999 |
| JP | 2000-147643 | 5/2000 |
| JP | 2001-133854 | 5/2001 |
| JP | 2006-178097 | 7/2006 |
| JP | 2007-264435 | 10/2007 |

OTHER PUBLICATIONS

Japanese Office Action issued Oct. 1, 2013 in corresponding Japanese Patent Application No. 2011-511386 with English translation.

* cited by examiner

*Primary Examiner* — Clayton E Laballe
*Assistant Examiner* — Noam Reisner
(74) *Attorney, Agent, or Firm* — Wenderoth, Lind & Ponack, L.L.P.

(57) ABSTRACT

So that parallax-free images can be taken even if the camera is rotated during filming and the direction of the camera is changed to an arbitrary direction, the auxiliary device is provided with a camera body retaining part and, in an equidistant surface centered on the nodal point of the camera, a camera attachment part. Regardless of the angle the camera makes as a result of the way in which the camera attachment part is mounted to a camera support mechanism part, the nodal point of the camera remains at a fixed location.

10 Claims, 23 Drawing Sheets

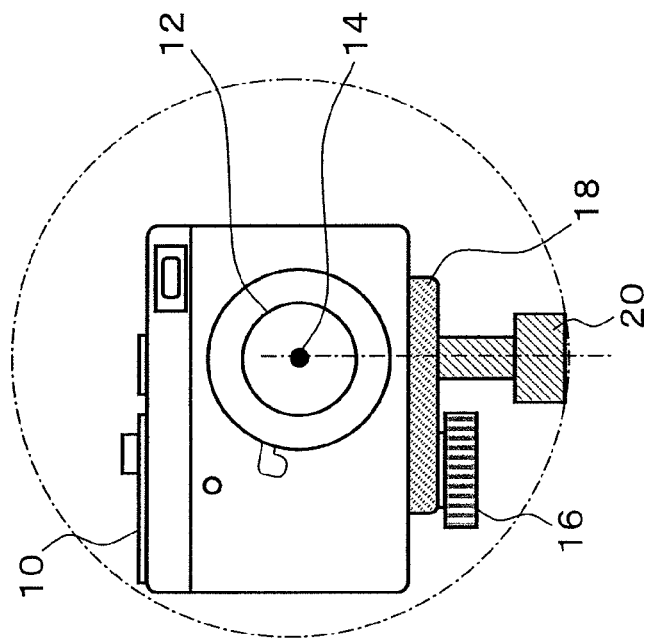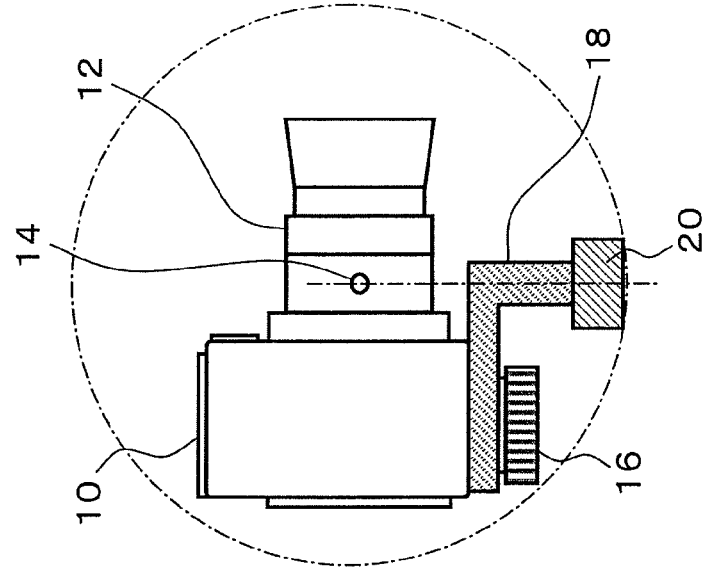

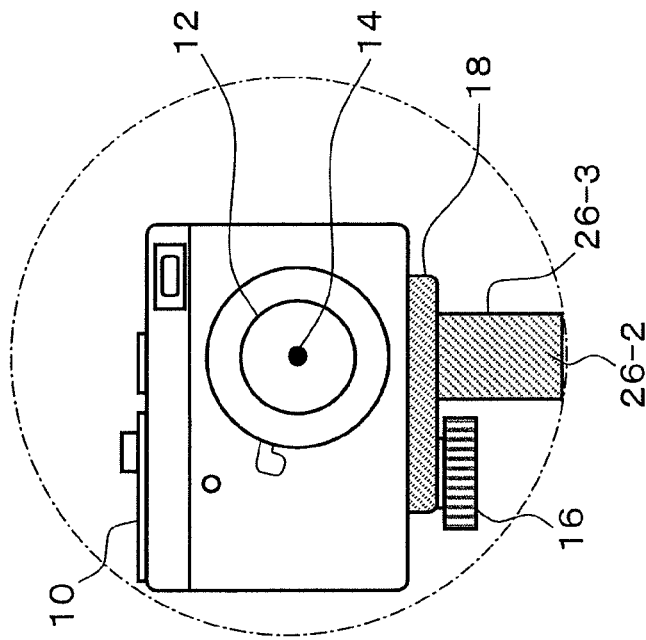
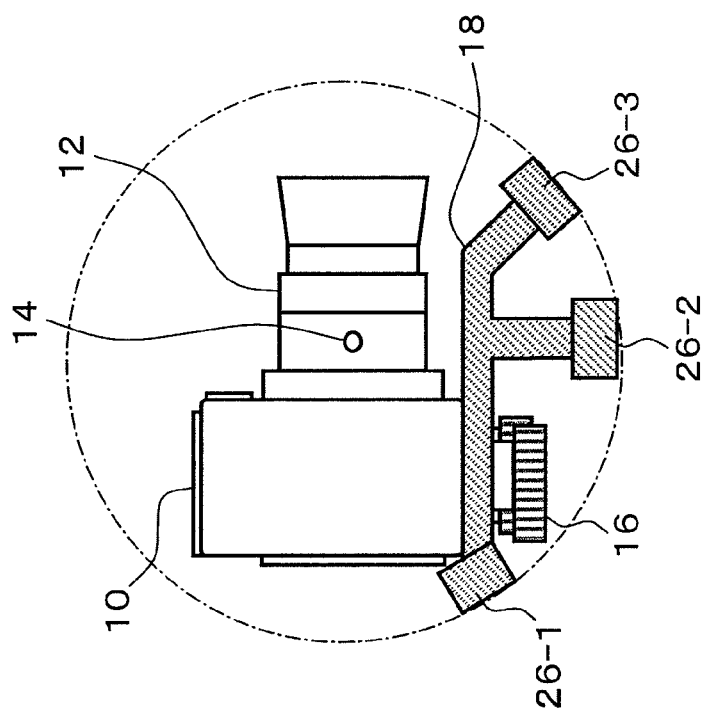

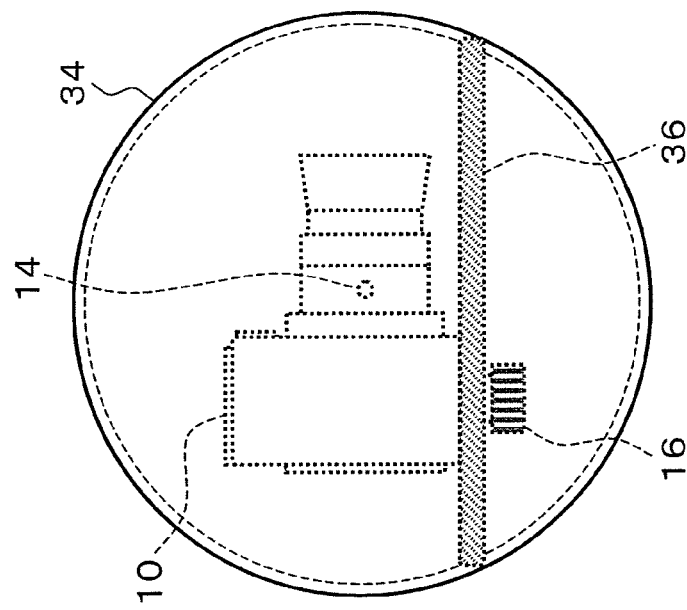
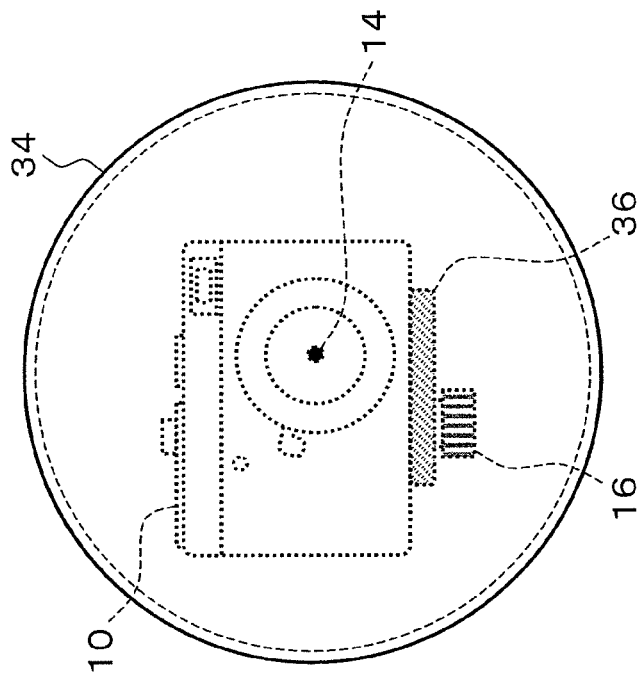

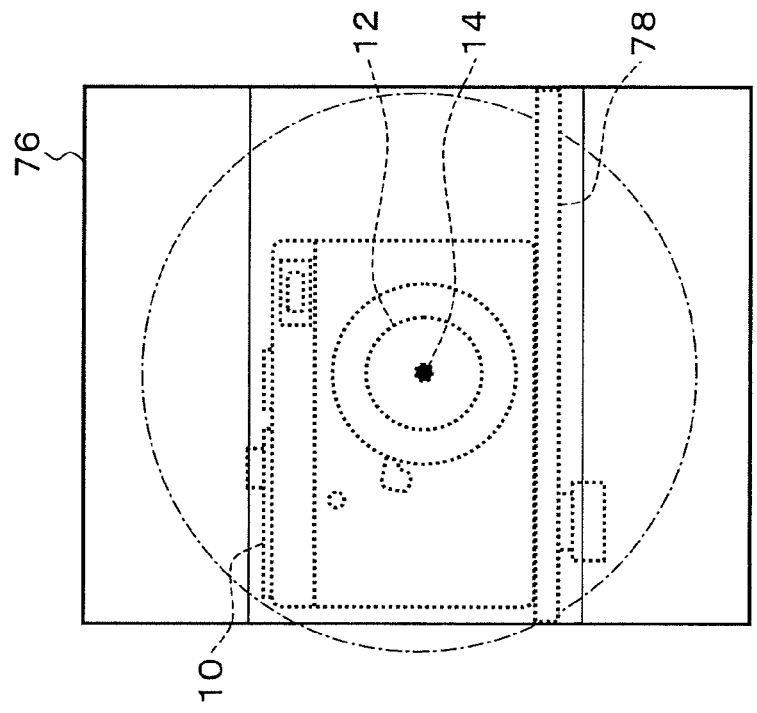
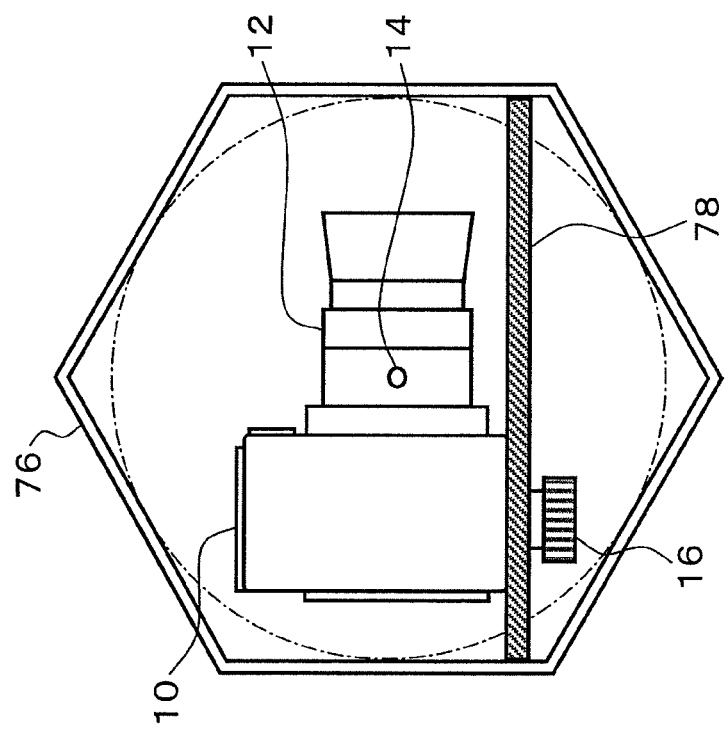
FIG. 10A
FIG. 10B

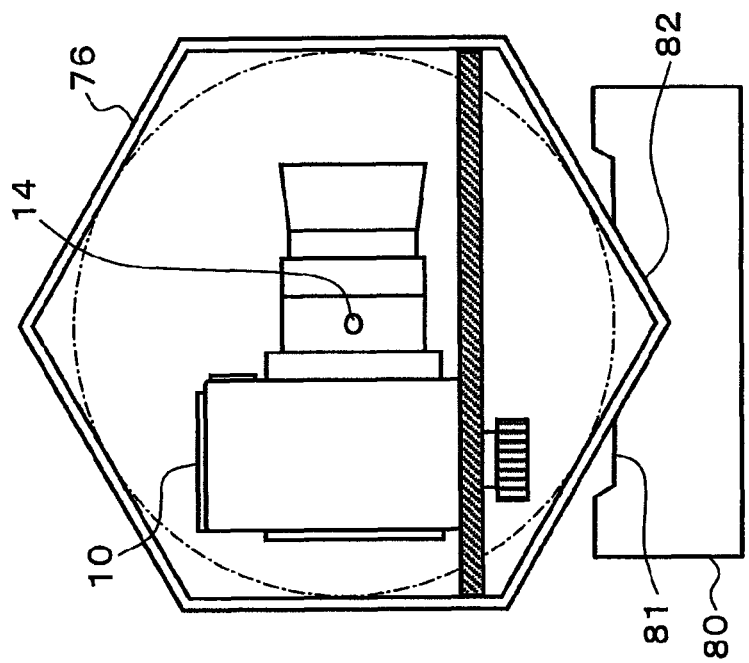
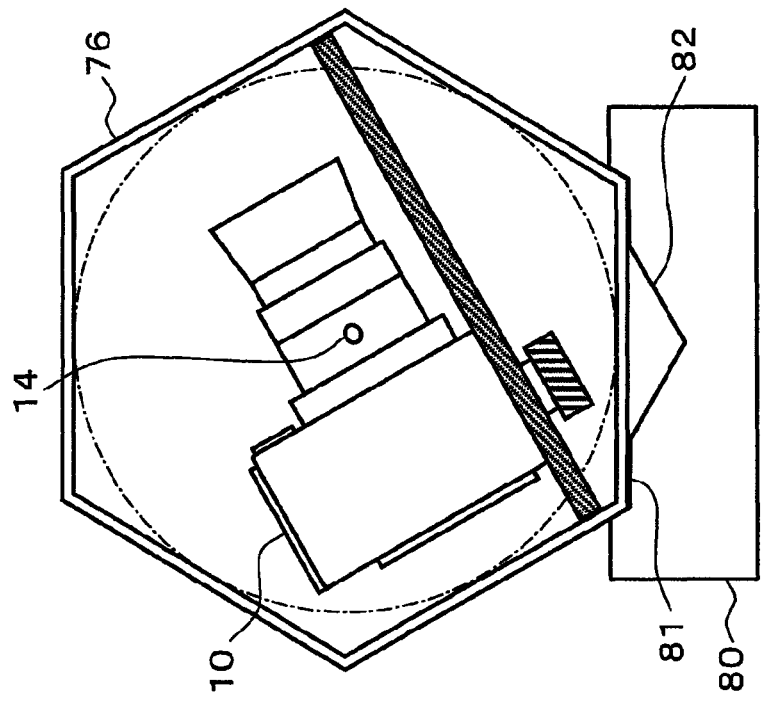

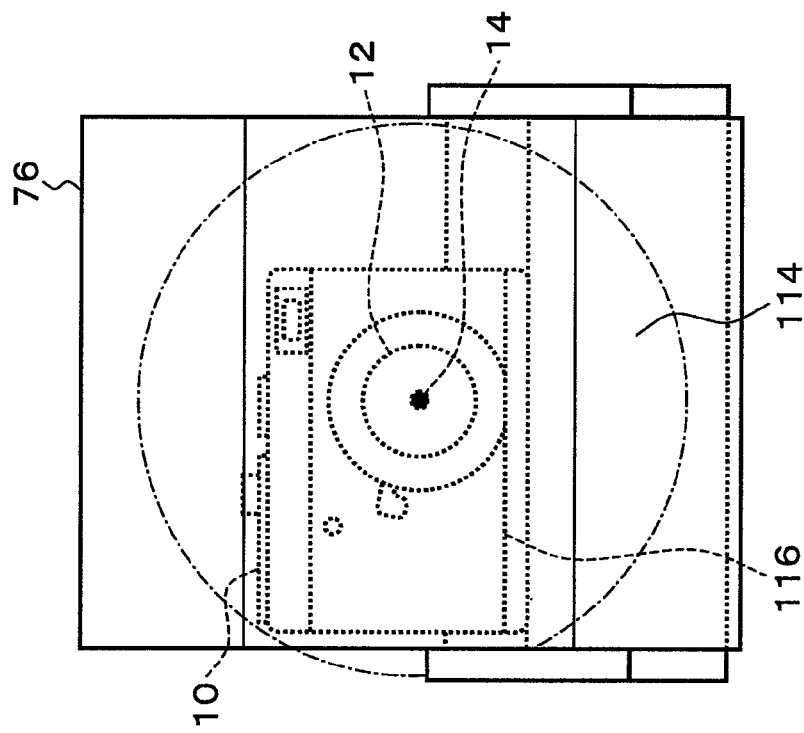
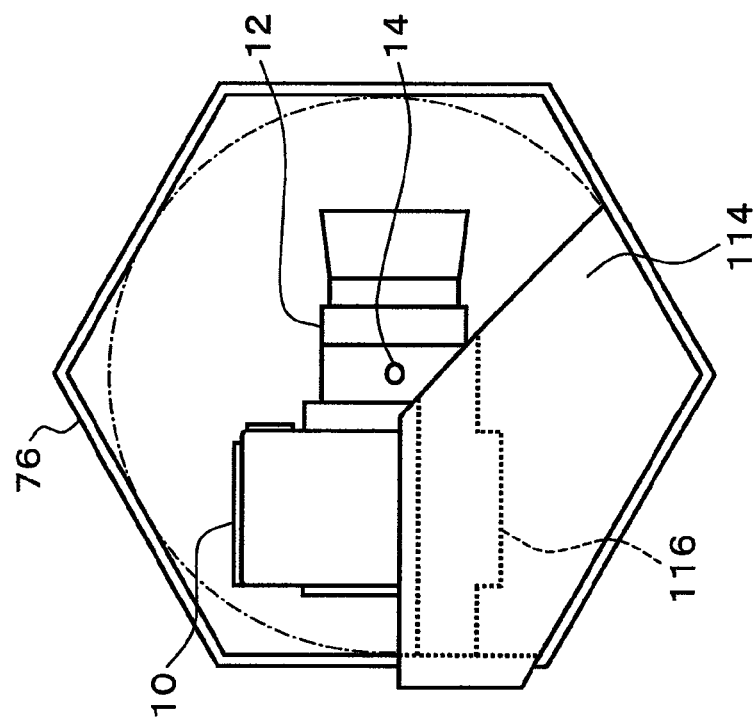

AUXILIARY DEVICE FOR FULL-CIRCLE PANORAMIC VIDEO IMAGING

This application is a Continuation Application of International Application No. PCT/JP2010/057336, filed Apr. 26, 2010.

TECHNICAL FIELD

The present invention relates to an auxiliary device for panoramic imaging for carrying out imaging in full-circle directions and relates to an auxiliary device for full-circle panoramic video imaging in which, when images are to be taken with respect to a plurality of directions, a nodal point of an image taking device is always at the center of rotation so that taken images can be synthesized without parallax.

BACKGROUND ART

When panoramic video images or full-circle video images are to be taken by a camera, a plurality of video images are taken while changing the direction of the camera, and the images are synthesized. Therefore, for example, the number of synthesized images is reduced by obtaining wide-angle images by using a fish-eye lens or the like. However, synthesis of a plurality of images cannot be avoided, and the plurality of images has to be synthesized without parallax. This is an essential problem derived from the fact that only the limited region in the front can be taken by the video images of the camera. As a system which takes a plurality of images and obtains synthesized images, a method using an electronic camera has been proposed. The electronic camera has: a lens barrel including an imaging optical system and an imaging element and a lens-barrel turning means which turns the lens barrel about an object-side principal point of the imaging optical system to the direction orthogonal to the optical axis of the imaging optical system; wherein, the lens barrel is turned by using the lens barrel turning means, divided object images are taken by taking images a plurality of times while sequentially changing the image-taking ranges, and the data of the plurality of images obtained by the imaging element for each image taking is recorded together with the information of the rotation angle of the lens barrel. Then, the obtained data of the plurality of images is synthesized into the data of one image based on the information of the rotation angle of the lens barrel. (For example, see Patent Document 1). In order to take video images by which the plurality of taken video images can be synthesized without misalignment, normally, rotation about a nodal point of the camera is carried out. The nodal point is the only point at which an object is optically reduced and rotated by a lens and converged before the object reaches a light-receiving surface of the camera. In order to rotate the camera about the nodal point, conventionally, a nodal-point adjustment device 210 as shown in FIG. 22 has been used. In FIG. 22, a front/back direction slide part 218 bored in a camera support member 214 for attaching a camera is provided so that the camera attached to a camera attachment part 216 can be moved to the front/back. The camera support member 214 is maintained at a fixed height by a supporting pillar 220. A base material 222 having a left/right direction slide part 224 bored therein is fixed to a certain fixed position by a screw 226. Furthermore, the screw 226 is inserted in a center position of a rotating mount (not shown) to fix the nodal-point adjustment device 210.

FIGS. 23A and 23B show a state in which the camera 10 is attached to the nodal-point adjustment device 210. A screw 212 is screw-tightened in an attachment screw hole of the camera, thereby fixing the camera 10. In order to adjust the position of the nodal point 14 of the camera 10 to the center of rotation of the mount, the front/back direction is adjusted by moving the position by the slide part 218 bored in the camera support member 214, and the left/right direction is adjusted by moving the position by the slide part 224 bored in the camera support base material 222. The adjustment is carried out, for example, by a so-called dry battery method in which two dry batteries are arranged and subjected to imaging so as to carry out adjustment to eliminate parallax. As a simple method to set the nodal point, a structure in which a screw hole is provided in the main body of the camera so that the nodal point is positioned at the center of rotation of the mount has been proposed (for example, see Patent Document 2).

Patent Document 1: Japanese Patent Application Laid-Open (kokai) No. H09-18750 Document Patent Document 2: Japanese Patent Application Laid-Open (kokai) No. 2006-178097 Document In order to synthesize a plurality of images, parallax-free video images have to be taken; and, in order to do that, images are taken while the camera is directed in various directions centered on the nodal point of the camera. Generally, panoramic video images take a plurality of images in the horizontal direction. A nodal point adjustment device therefor sets the camera directed in the horizontal direction and then searches for the nodal point by taking images while moving the camera in the front/back left/right directions. When the nodal point is set, the camera is rotated in the horizontal direction at a fixed angle by a panoramic mount or the like to take video images.

In the case in which a nodal-point attachment screw hole which enables the nodal point to be easily set for the mount or the like is provided integrally with the camera, adjustment of the nodal point is not required. However, in these methods, when full-circle image taking is to be carried out, the nodal point adjustment device requires a nodal point adjusting operation again since the nodal point adjustment device is fixed with a changed direction of the camera, and there is a problem that a complicated operation has to be carried out many times. Moreover, the structure in which the nodal-point attachment screw hole is integrated with the camera can be applied only to the case in which the direction of the camera is fixed, and it has been impossible to take images with changed directions of the camera.

DISCLOSURE OF THE INVENTION

According to the present invention to provide an auxiliary device for full-circle panoramic video imaging which is capable of easily setting the nodal point at a position on the axis of rotation and free from displacement of the position of the nodal point even when the direction of the camera is changed.

In order to enable imaging of parallax-free images even when the direction of a camera is changed to an arbitrary direction, the present invention is realized by an auxiliary device for full-circle panoramic video imaging having: a retaining part of a camera body and one or a plurality of camera attachment parts at an equidistant surface centered on a nodal point of the camera, each camera attachment part having a different attachment angle of the camera; wherein, when the camera attachment part is attached to a camera support mechanism part having a rotation part, the nodal point of the camera is configured to be positioned on the axis of rotation of the rotation part provided in the camera support mechanism.

The camera body is retained by the retaining part, and the attachment part to be attached to the camera support mechanism is present on the surface equidistant from the nodal point of the camera. Therefore, at the same time as attachment, the nodal point is fixed onto the axis of rotation of the rotation part provided in the camera support mechanism part. When the direction of the camera is to be changed, the direction can be changed only by changing the auxiliary device to the auxiliary device for full-circle panoramic video imaging having the attachment part at a desired angle. The auxiliary device for full-circle panoramic video imaging may have a structure provided with a plurality of attachment parts. All of the plurality of attachment parts is on the surface equidistant from the nodal point of the camera, and the nodal point of the camera can be set at the same position on the axis of rotation.

When a lens of the camera is replaced, for example, when a normal lens is replaced by a telescopic lens, the nodal point of the camera is changed due to the lens. Therefore, an adjustment mechanism capable of carrying out fine adjustment in the front/back direction of the camera may be provided.

In order to enable the attachment part of the auxiliary device for full-circle panoramic video imaging to direct the camera in an arbitrary direction with respect to the structure fixed by one point, the attachment part having an arc shape is provided at an equidistant position centered on the nodal point of the camera, thereby providing the auxiliary device for full-circle panoramic video imaging. In the case in which such a shape of the attachment part is employed, when the arc shape is in a vertical direction, in other words, in the direction orthogonal to the rotation of a mount, the direction of the camera can be changed to almost all directions without changing the position of the nodal point in combination with the rotation of the mount, and full-circle panoramic imaging can be carried out.

The attachment part having the arc shape can be attached at any position on an arc shape. However, an attachment hole may be provided at an arbitrary position, and the attachment part may be attached to a camera support mechanism part at a predetermined position by utilizing the attachment hole.

The attachment part of the camera may have a spherical shape so as to further freely change the direction of the camera. When the nodal point of the camera is set at the center part of the sphere of the spherical shape, all the surfaces on the spherical surface are equidistant from the nodal point; and, even when the camera is directed in any direction, the position of the nodal point in the case in which it is mounted on the camera support mechanism part is always fixed.

The attachment part having the spherical shape may employ a transparent material and cover the entire camera; or, if the material is not transparent, an opening part may be provided at the part opposed to the lens of the camera.

In the auxiliary device for full-circle panoramic video imaging having the attachment part having the spherical shape, an installation base of a part for receiving the camera support mechanism part is provided with an arc-shaped concave part to provide a structure so that the nodal point is always free from displacement even when the attachment part having the spherical shape is repeatedly mounted thereon. Therefore, in the case in which the auxiliary device for full-circle panoramic video imaging having an attachment part having flat-surface shape is to be mounted on the camera support part, an installation base provided with a recessed part is further provided so that the nodal point of the camera matches the axis of rotation even when any flat-surface part of a plurality of flat-surface parts is attached to the camera support part.

The attachment part of the auxiliary device for full-circle panoramic video imaging may have a structure having a plurality of flat surfaces in contact with a virtual spherical surface which is a surface equidistant from the nodal point of the camera. Alternatively, the attachment part may have a structure as a polyhedron in which all surfaces are in contact with the virtual spherical surface.

In the case in which the auxiliary device for full-circle panoramic video imaging having the attachment part having the flat-surface shape is to be mounted on the camera support part, an installation base provided with a recessed part is further provided so that the nodal point of the camera matches the axis of rotation even when any flat-surface part of the plurality of flat-surface parts possessed by the auxiliary device for full-circle panoramic video imaging is attached to the camera support part.

In the case in which the auxiliary device for full-circle panoramic video imaging having the attachment part having the flat-surface shape is to be mounted on the camera support part, the recessed part is provided with two recessed parts so that the nodal point of the camera matches the axis of rotation even when the auxiliary device is attached to the camera support part while a ridge at which sides of the flat-surface parts are intersecting is in a lower side. One of the recessed parts is for the case in which the flat surface of the attachment part is placed in the lower side, and the other is for the case in which the ridge is placed in the lower side. The installation base is provided with the recesses so that the position of the nodal point is not changed in any case.

A support base in which a plurality of recessed parts corresponding to the outer shape of the installation base are provided with various angles centered on the central axis of the nodal point may be provided so that a horizontal direction can be changed without changing the nodal point. Furthermore, when the outer shape of the installation base is caused to be circular, the recessed part of the support base also becomes circular; therefore, the direction of the installation base to which the camera is attached can be changed to an arbitrary horizontal angle.

The installation base may be an installation base in which the recessed part provided in the installation base for placing a flat-surface part, a ridge part, or a corner part is provided with a plurality of recessed parts so that the horizontal direction can be changed without changing the position of the nodal point. In this case, the direction can be changed in the horizontal direction only by the installation base.

Furthermore, even when the installation base is provided with the recessed parts in the combination of the flat-surface part and the ridge part, the flat-surface part and the corner part, the ridge part and the corner part, or the flat-surface part, the ridge part, and the corner part, the recessed parts are formed so that the position of the nodal point is not changed, in other words, the depths of the recessed parts in the case in which the flat-surface part, the ridge part, and the corner part are combined are set so that the nodal point of the camera is always at a fixed position.

The camera retaining part may have a structure in which a camera mounting part using part of the camera as a frame is provided in order to mount the camera so that the camera attachment part is on the spherical surface centered on the nodal point of the camera, wherein installation of the camera can be simply carried out.

The auxiliary device may be a device in which camera retaining lateral plates are provided at both lateral surfaces of the camera, the camera retaining lateral plates retaining the camera by a camera retaining part for setting the nodal point of the camera on a line connecting the rotation center points of the lateral plates; and an installation base rotated about the vertical line of the nodal point of the camera are provided, the installation base having recessed parts determining the positions of the camera retaining lateral plates.

The camera retaining lateral plate has a disk like or polygonal shape, and the center of rotation is the center point of the circle or a point having a fixed distance from the side or corner of the polygon. In this case, rotation is limited to the rotation in the vertical direction of the camera; however, full-circle direction imaging can be carried out by a combination with the installation base which rotates in the horizontal direction. When images are taken by using the auxiliary device for full-circle panoramic video imaging according to the present invention, the nodal point can be set at the same position on the axis of rotation even when the direction of the camera is changed; therefore, a plurality of parallax-free video images can be taken.

BRIEF DESCRIPTION OF THE DRAWINGS

FIGS. 1A and 1B are drawings in which an auxiliary device for full-circle panoramic video imaging of the present invention is attached to a camera;

FIGS. 5A and 5B are drawings in which an auxiliary device for full-circle panoramic video imaging is attached to the camera in the case in which the auxiliary device is provided with a plurality of attachment parts at different positions;

FIGS. 7A and 7B are drawings in which the camera is attached to an auxiliary device for full-circle panoramic video imaging, the auxiliary device having a spherical attachment part;

FIGS. 10A and 10B are drawings in which the camera is attached to an auxiliary device for full-circle panoramic video imaging, the auxiliary device provided with an attachment part having a plurality of flat-surface shapes;

FIGS. 12A and 12B are drawings of the case in which the auxiliary device for full-circle panoramic video imaging, the auxiliary device provided with the attachment part having the plurality of flat-surface shapes, is mounted on the installation base;

FIGS. 19A and 19B are drawings showing a camera retaining part provided with a frame of part of the camera in order to cause the camera to fit the polygonal attachment part;

BEST MODE FOR CARRYING OUT THE INVENTION

Figure 2:
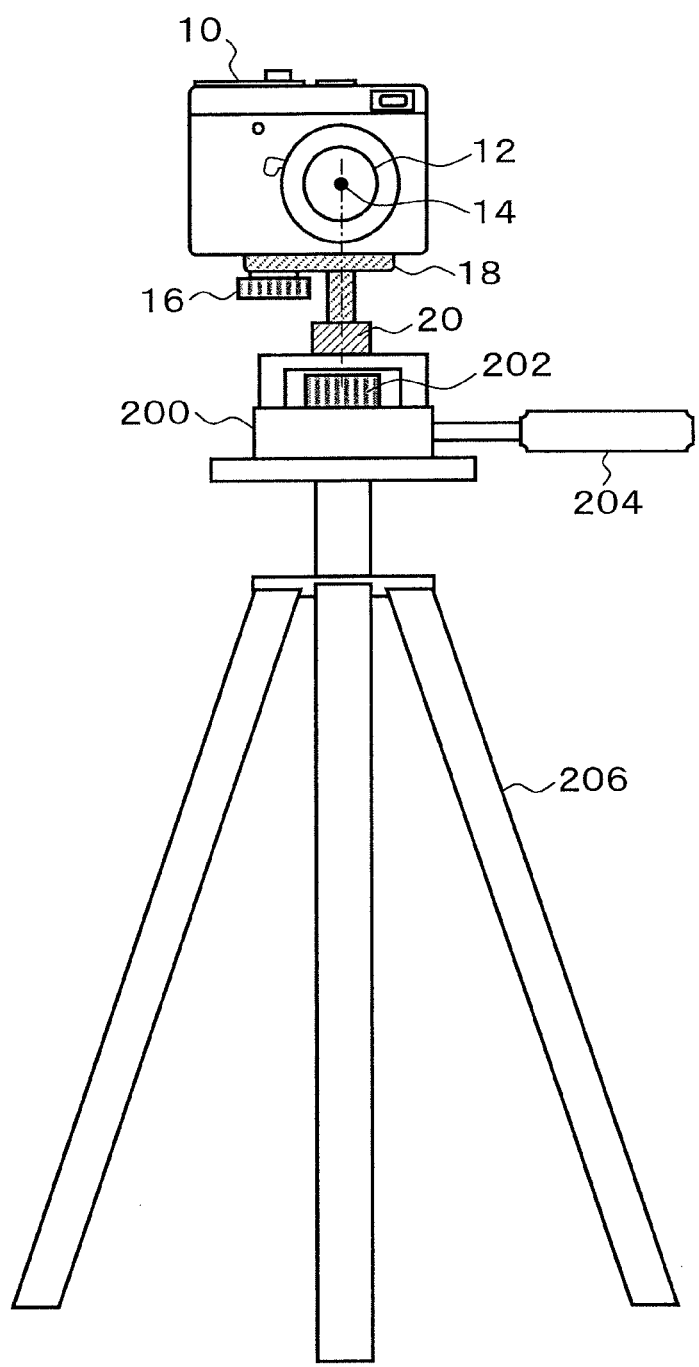
FIG. 2 is a drawing of the case in which the auxiliary device of full-circle panoramic video imaging of the present invention is attached to the camera to actually take images.

Hereinafter, embodiments of auxiliary devices for full-circle panoramic video imaging according to the present invention will be explained in detail with reference to drawings.

First Embodiment

First, the auxiliary device for full-circle panoramic video imaging, which fixes the position of a nodal point even when the direction of a camera is changed will be explained by FIGS. 1A to 5B.

FIGS. 1A and 1B show specific examples in which the auxiliary device for full-circle panoramic video imaging according to the present invention is attached to a camera 10. FIG. 1A is a side view, and FIG. 1B is a front view. The auxiliary device for full-circle panoramic video imaging is composed of a camera retaining part 16, a support arm 18, and an attachment part 20. The camera 10 is provided with an imaging lens 12, and a nodal point 14 is on a central axis of the circular lens 12. When images are taken while the nodal point 14 is fixed, parallax-free video images can be taken regardless of the direction in which the camera 10 is directed.

Therefore, the attachment part 20 of the auxiliary device for full-circle panoramic video imaging shown in FIGS. 1A and 1B are disposed at a position at which the attachment surface thereof is in contact with an equidistant plane centered on the nodal point 14, in other words, the plane shown by a dashed-dotted line in FIGS. 1A and 1B. Note that the nodal point 14 is a virtual point, and the nodal point 14 is shown for explanation in the drawings.

The same applies also to the nodal point 14 shown in below drawings. The manufacturer of the camera 10 knows the nodal point 14 of the camera 10. Therefore, the nodal point 14 can be found out by making an inquiry, and the retaining part 16, the support arm 18, and the attachment part 20 of the camera 10 can be designed and manufactured according to that. If the nodal point 14 of the camera 10 is unknown, the nodal point 14 can be found out by a user, for example, by using the above described dry-battery method.

FIG. 2 is a drawing of the case in which the camera 10 fixed to the auxiliary device for full-circle panoramic video imaging is mounted on a mount 200 and a tripod 206 to take images. The camera 10 is fixed to the auxiliary device for full-circle panoramic video imaging to attach the camera to the tripod 206, which is provided with the mount 200, by tightening a screw at the retaining part 16 in a fixing screw hole (not shown) provided on the camera 10. The nodal point 14 positioned on the central axis of the lens 12 is caused to position at the center of rotation of the mount 200, which is shown by a dashed-dotted line of FIG. 2, by the auxiliary device for full-circle panoramic video imaging. The auxiliary device for full-circle panoramic video imaging and the mount 200 are fixed by tightening a screw 202 of the mount in a screw hole of the attachment part 20. The mount 200 can be rotated by a handle 204 and can be rotated by 360 degrees. The nodal point 14 of the camera 10 is on the central axis of rotation of the mount 200; therefore, even when freely rotated, the nodal point is always at a fixed position, and parallax-free video images can be taken.

Figure 3B:
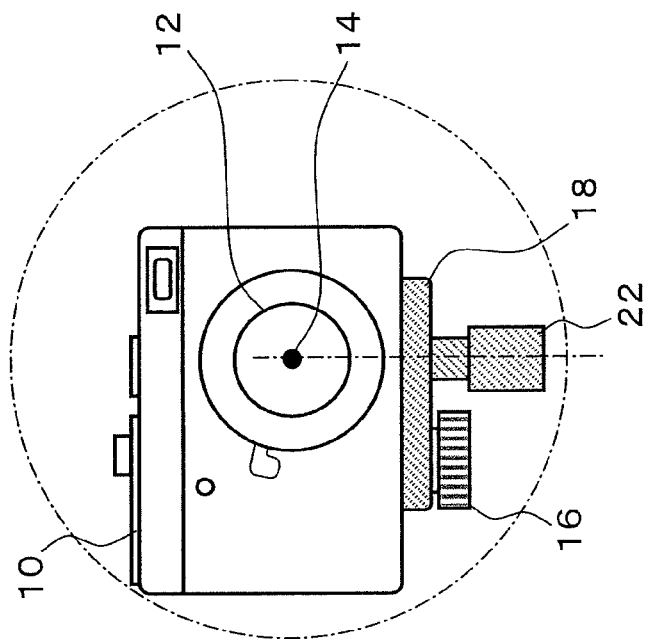
FIGS. 3A and 3B are drawings in which an auxiliary device for full-circle panoramic video imaging is attached to the camera in the case in which the position of an attachment part of the auxiliary device is in the front side of the camera.
Figure 3A:
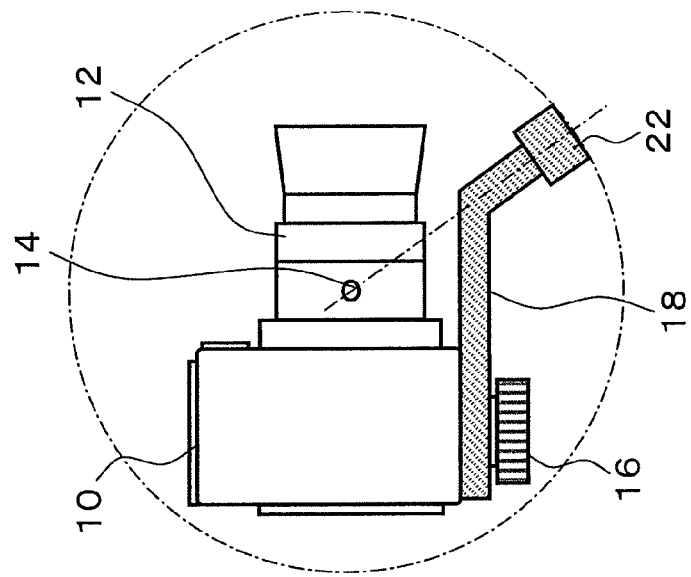
Figure 4A:
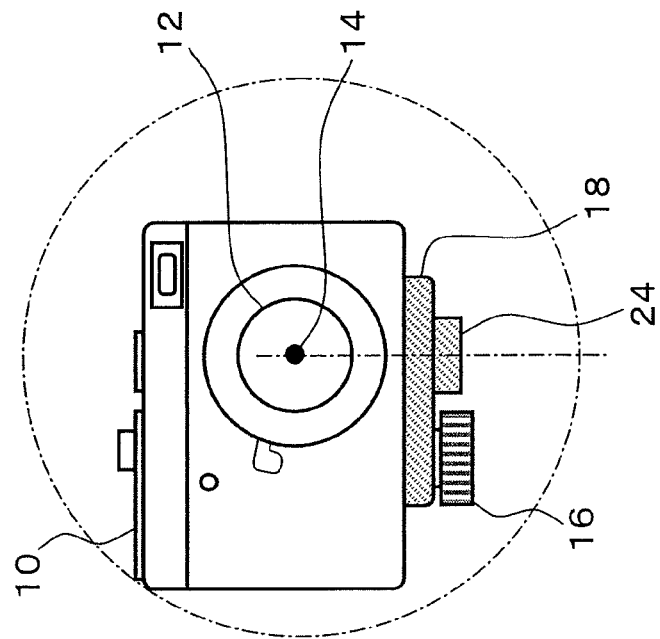
FIGS. 4A and 4B are drawings in which an auxiliary device for full-circle panoramic video imaging is attached to the camera in the case in which the position of an attachment part of the auxiliary device is in the back side of the camera.
Figure 4B:
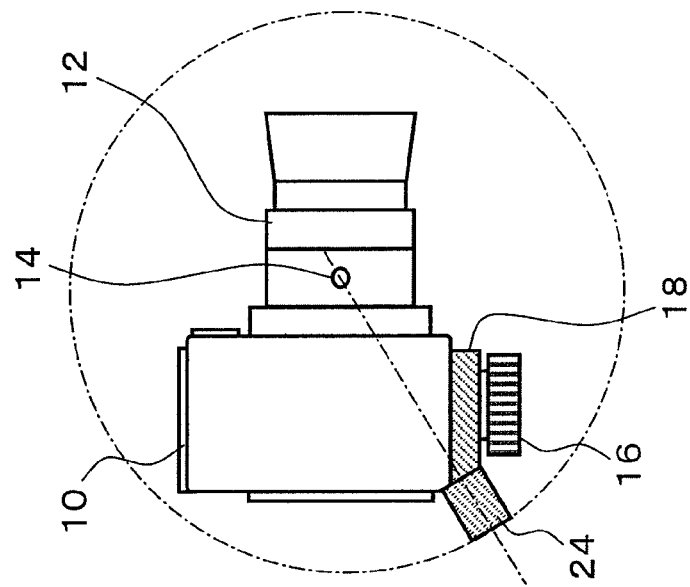

FIGS. 3A, 3B, 4A and 4B show examples of the case in which the angle of the attachment part of the auxiliary device for full-circle panoramic video imaging is changed, in other words, the angle of elevation of the lens of the camera 10 is changed to take images. In FIGS. 1A and 1B, the attachment part 20 is positioned in the direction perpendicular to the camera 10; while FIGS. 3A and 3B show the example of the case in which the camera 10 is directed downward to take images, and FIGS. 4A and 4B show the example of the case in which the camera 10 is directed upward to take images. In both of the cases, attachment parts 22 and 24 are positioned at the positions equidistant from the nodal point 14 of the camera 10; and, when the attachment part is mounted on the mount 200, the axis of rotation matches the nodal point. When a plurality of auxiliary devices for full-circle panoramic video imaging in which the position of the attachment part is changed are prepared in order to provide the attachment parts of the auxiliary devices for full-circle panoramic video imaging at the positions equidistant from the nodal point 14 of the camera 10 and cause the axis of rotation and height of the mount 200, which rotates, to match, a plurality of parallax-free video images can be taken even when the camera 10 is directed in arbitrary directions.

In FIGS. 5A and 5B, the auxiliary device for full-circle panoramic video imaging is provided with three attachment parts 26-1 to 26-3, and the direction of the camera 10 is changed by the one auxiliary device for full-circle panoramic video imaging only by changing the attachment parts 26-1 to 26-3. In FIGS. 5A and 5B, the three attachment parts are shown; however, as a matter of course, an attachment part(s) can be provided at an arbitrary position(s) equidistant from the nodal point 14.

Three-dimensional attachment parts can be disposed not only on a planar surface, but also on a virtual spherical surface.

Second Embodiment

Figure 6A:
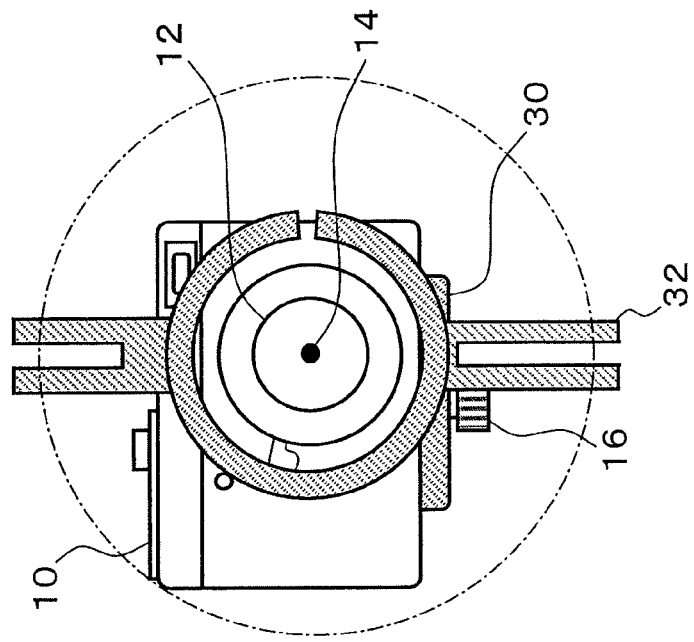
FIGS. 6A and 6B are drawings in which the camera is attached to an auxiliary device for full-circle panoramic video imaging, the auxiliary device having an arc-shaped attachment part.
Figure 6B:
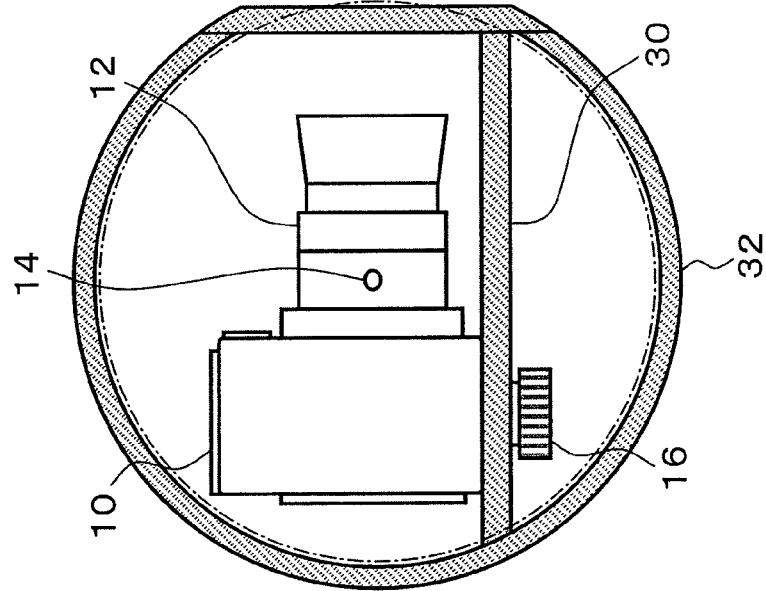

FIGS. 6A and 6B are drawings in which an attachment part 32 is provided on a peripheral surface, which is shown by a dashed-dotted line and is equidistant from the nodal point 14, and on a surface orthogonal to the camera 10. FIG. 6A is a side view, and FIG. 6B is a front view. An attachment arm 30 is fixed to the camera 10 by the retaining part 16, and the attachment part 32 is stably fixed by the attachment arm 30. A front part of the lens 12 is provided with a circular reinforcing part in order to increase the strength of the attachment part 32 without disturbing imaging.

The attachment part 32 is provided with a slit at a center part thereof, and a fixing screw is inserted therein and tightened so that the attachment part can be fixed at any position. In this structure, horizontal rotation can be carried out by the mount, and vertical rotation can be realized by the position of the attachment part 32; therefore, images can be taken with respect to full-circle directions.

As a matter of course, the attachment part may have a planar shape and be fixed to the mount by a fixing tool without providing the slit in the attachment part 32, and specific shapes and attachment methods are not limited to those in the mode shown in FIGS. 6A and 6B. The attachment part 32 is not limited to be on the surface orthogonal to the camera 10, but may be at any position on the virtual spherical surface centered on the nodal point 14. In the case in which the nodal point of the camera 10 is unknown or in the case in which the lens is replaced, the nodal point may be found out by, for example, the above described dry-battery method so that the position of the camera 10 can be adjusted to the front/back. Note that, the nodal point is at the center of the lens; in the auxiliary device for full-circle panoramic video imaging, the lens center of the camera 10 is mounted so as not to be displaced in the left/right direction; and adjustment in the front/back direction of the camera 10 suffices.

Third Embodiment

FIGS. 7A and 7B are drawings in which the camera 10 is disposed in a spherical attachment part 34.

FIG. 7A is a side view, and FIG. 7B is a front view. In FIGS. 7A and 7B, the spherical attachment part 34 is transparent, and, in imaging, video images are taken from the lens 12 via the transparent attachment part. The nodal point 14 is positioned at the center point of the spherical attachment part 34. The spherical attachment part 34 has a structure in which part thereof can be divided.

When the camera 10 is to be fixed to the auxiliary device for full-circle panoramic video imaging, the divided part of the spherical attachment part 34 is detached, and the camera 10 is fixed in the spherical attachment part 34 by a screw of the retaining part 16 at an attachment arm 36. After the camera 10 is fixed, the divided and detached part of the spherical attachment part 34 is reassembled to form the spherical attachment part 34. In this spherical attachment structure, the nodal point 14 is present at the center of the sphere.

Therefore, there is an advantage that the position of the nodal point 14 is always fixed regardless of the direction in which the spherical attachment part 34 is directed.

Figure 8A:
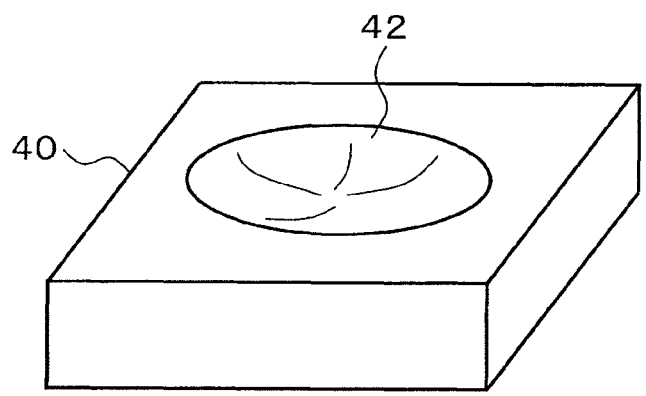
FIGS. 8A and 8B are drawings showing an installation base of the auxiliary device for full-circle panoramic video imaging, the auxiliary device having the spherical attachment part, wherein the auxiliary device for full-circle panoramic video imaging is mounted on the installation base.
Figure 8B:
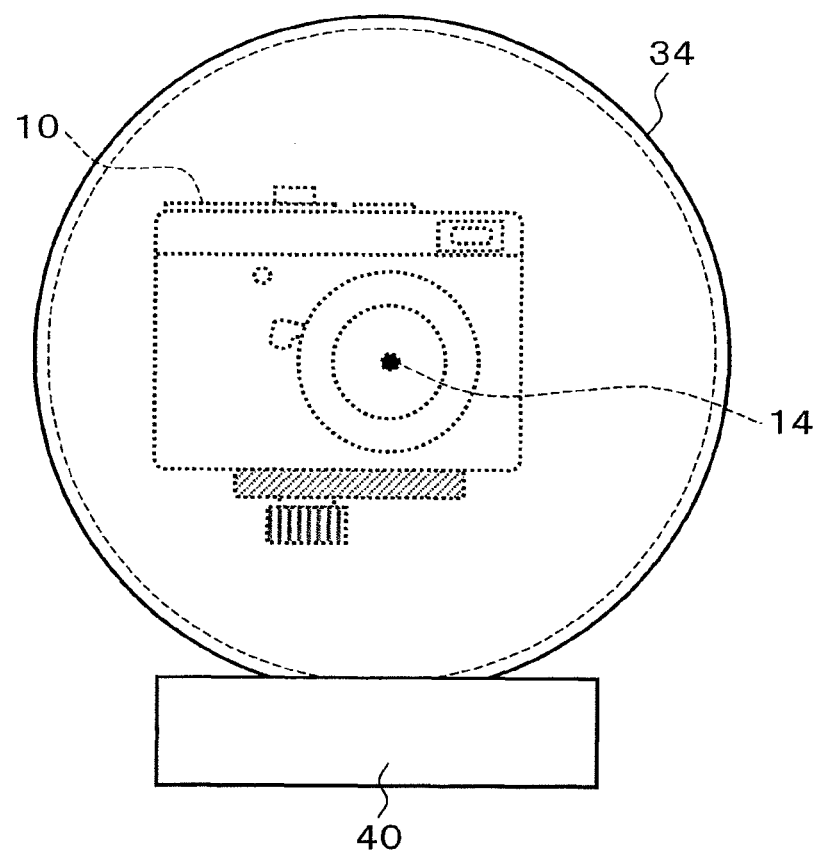

FIG. 8A shows an installation base 40 of the case in which the spherical attachment part 34 is installed on the mount. The installation base 40 is provided with a curved concave surface 42 corresponding to the spherical attachment part 34 so that part of the spherical surface fits. FIG. 8B is a drawing of the case in which the auxiliary device for full-circle panoramic video imaging, in which the camera 10 is fixed, is mounted on the installation base 40. When the installation base 40 is fixed to a tripod, the position of the nodal point 14 is fixed regardless of the position of the spherical peripheral surface. In this case, there is an advantage that the mount is not required since horizontal rotation can be also carried out.

The installation base 40 is not required to be fixed to the tripod, but may be placed on, for example, a table or a chair in a park as long as it can be fixed at the location. The spherical attachment part 34 can set the direction of the camera 10 in an arbitrary direction by virtue of the spherical shape, and full-circle video images can be easily taken.

Figure 9A:
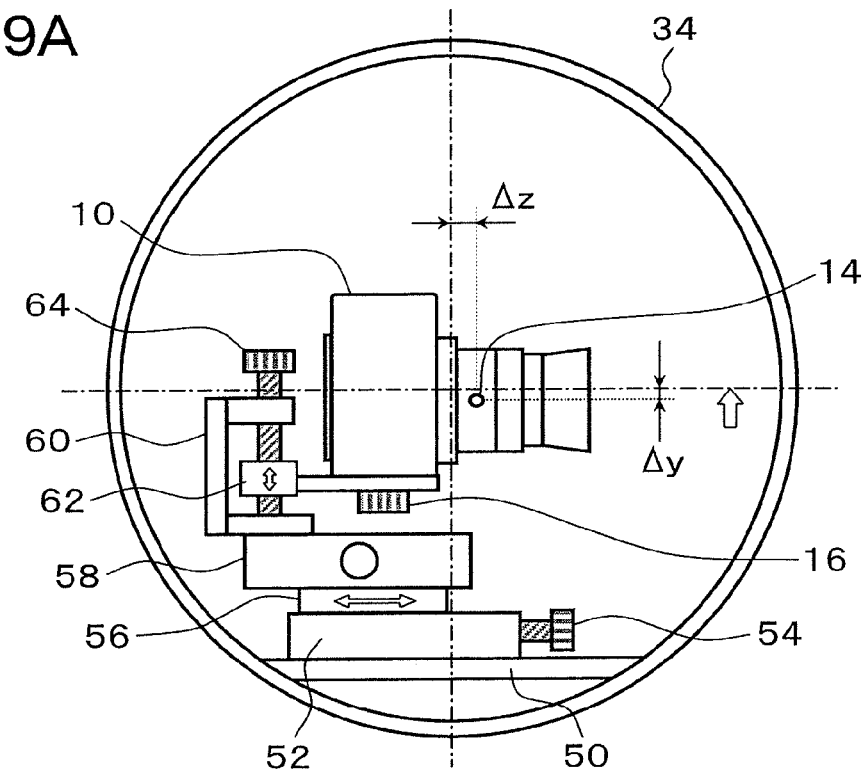
FIGS. 9A and 9B are drawings of the case in which a position adjustment mechanism of a nodal point of the camera is provided in an auxiliary device for full-circle panoramic video imaging, the auxiliary device having the spherical attachment part.
Figure 9B:
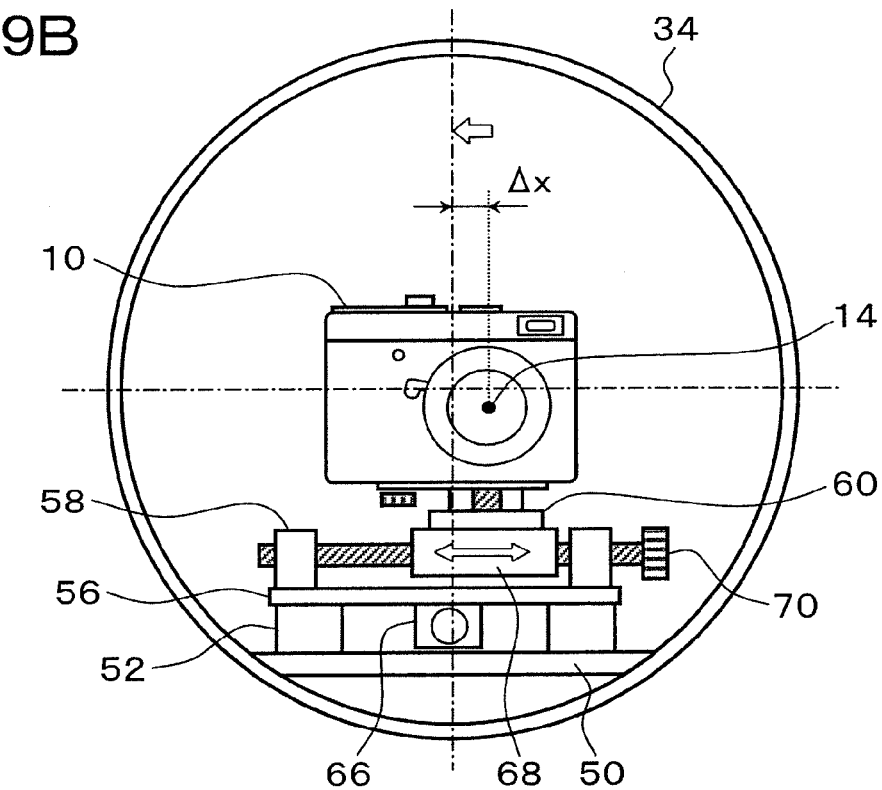

FIGS. 9A and 9B are drawings of the case in which an adjustment mechanism for setting the nodal point 14 at the center of the spherical attachment part 34 is added. FIG. 9A is a side view, and FIG. 9B is a front view. In the adjustment mechanism, a support 52 is placed on a base 50, a first stage 56 moves the nodal point 14 in the left/right direction of the camera 10 by rotating a screw 54 by a first screw mechanism 66 so that front/back displacement Δz in the depth direction of the lens, for example, shown in FIG. 9A is eliminated.

The first stage 56 is provided with a second screw mechanism 58, which adjusts the left/right-direction position of the camera 10, rotates a screw 70, moves a second stage 68, and adjusts left/right displacement Δx. Furthermore, the second stage 68 is provided with a third screw mechanism 60 for adjusting the vertical-direction position of the camera 10, wherein a third stage 62 on which the camera 10 is mounted can be moved up/down by a screw 64. Vertical displacement Δy is adjusted by the third screw mechanism. As a matter of course, when an operation to position the nodal point 14 at the center of the spherical attachment part 34 is to be carried out, the spherical attachment part 34 has a dividable structure so that the adjustment screws can be rotated after the structure is divided into two. Moreover, the nodal point 14 can be also adjusted by replacing the lens. In the case in which the nodal point 14 of the camera 10 is known, only by adjusting the nodal point to the center of the spherical attachment part 34 in this manner, parallax-free video images can be taken thereafter. Even in the case in which the nodal point 14 is unknown, the nodal point 14 is present on the axis that passes through the center of the lens 12; therefore, first, adjustment is made by watching the camera 10 from the front so that the center of the lens 12 comes to the center of the spherical attachment part 34; and, then, the position of the nodal point 14 is adjusted while moving the camera 10 in the front/back direction and taking video images so that the position of the nodal point 14 of the camera 10 becomes the center of the spherical attachment part 34. After once the nodal point 14 is set at the center point of the spherical attachment part 34, the nodal point 14 is not displaced even when the camera 10 is directed in an arbitrary direction by the spherical attachment part 34 thereafter.

FIGS. 7A to 9B are the cases in which the attachment parts are transparent. However, if the material of the attachment parts is not transparent, an opening may be provided in a region opposed to the lens 12. As a matter of course, an opening part may be provided even when the material is transparent.

Fourth Embodiment

FIGS. 10A and 10B are drawings showing a polygonal attachment part. FIG. 10A shows a side view, and FIG. 10B shows a front view. Flat-surface parts of the polygonal shape are disposed so as to be in contact with a virtual spherical surface centered on the nodal point 14, and the flat-surface parts are connected in the shape of a regular hexagon in the embodiment of FIGS. 10A and 10B. The camera 10 is fixed to an attachment arm 78, and the lens 12 is at a position opposed to one of the flat-surface parts of the polygonal attachment part 76. The nodal point 14 is positioned at the center part of the polygonal shape. Therefore, even when any one of ridge parts is in the lower side, the position of the nodal point 14 is not changed, and parallax-free video images can be taken. In FIGS. 10A and 10B, the material of the polygonal attachment part 76 is transparent; however, when a non-transparent material is used, an opening part may be provided at the position opposed to the lens 12. Also, the lens may be directed to the ridge part, and an opening may be provided in the region opposed to the lens 12.

Figure 11:
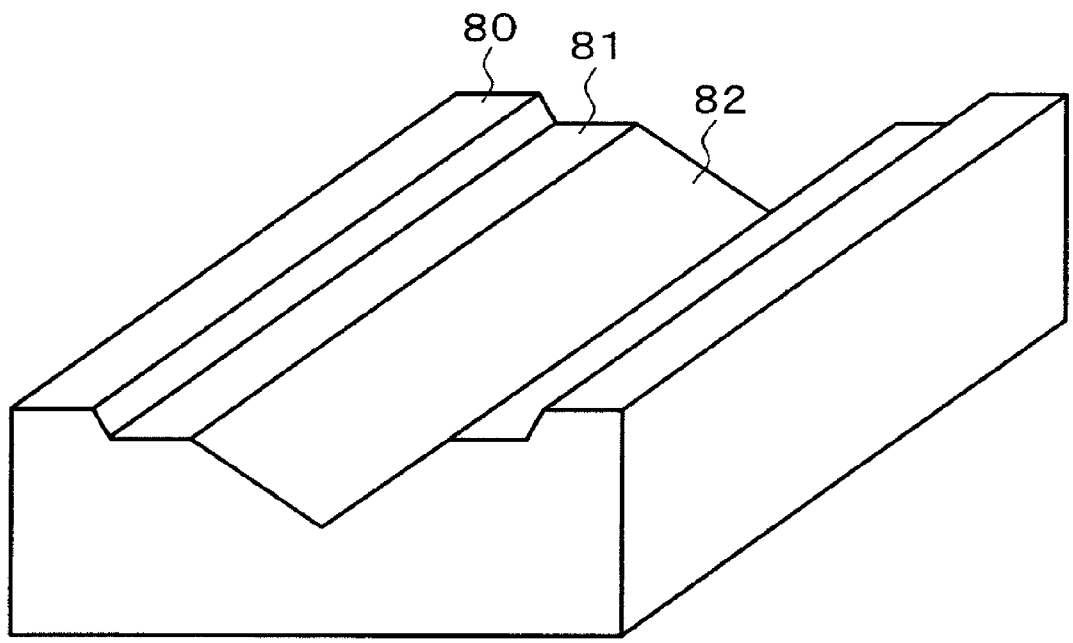
FIG. 11 is a drawing showing an installation base of the auxiliary device for full-circle panoramic video imaging, the auxiliary device provided with the attachment part having the plurality of flat-surface shapes.

FIG. 11 shows an installation base 80 of the case in which the auxiliary device for full-circle panoramic video imaging having the polygonal attachment part 76 is installed. The part to be attached is part of the polygonal shape. Therefore, when the direction of the camera 10 is to be changed, not only the ridge as shown in FIGS. 10A and 10B is placed in the lower side, but also the flat-surface part is placed in the lower side in some cases. In order to prevent the position of the nodal point from being displaced in any case, a V-shaped recessed part 82 serving as a reference in the case in which the ridge part of the polygonal attachment part 76 is placed in the lower side and a flat-surface recessed part 81 serving as a reference surface in the case in which the flat-surface part is placed in the lower side are provided.

FIGS. 12A and 12B are drawings of the case in which the auxiliary device for full-circle panoramic video imaging having the polygonal attachment part 76 is mounted on the installation base 80. FIG. 12A shows the case in which the flat-surface part of the polygonal attachment part 76 is placed in the lower side, and FIG. 12B is the drawing of the case in which the ridge of the polygonal attachment part 76 is placed in the lower side. In FIG. 12A, the attachment part is mounted on the installation base 80 in the state in which the surface of the virtual spherical surface, which is an equidistant surface of the nodal point 14, is in contact with the flat-surface recessed part 81. In FIG. 12B, the ridge part is mounted and installed on the V-shaped recessed part 82 when the ridge of the polygonal attachment part 76 is placed in the lower side. At this point, the virtual spherical surface centered on the nodal point 14 is configured to be on the horizontal surface of the flat-surface recessed part 81 as shown by a dashed-dotted line in FIG. 12B. The depths of the recessed parts are adjusted so that the two recessed parts of the installation base 80 have such a relation. Thus, the nodal point 14 can be set at the same position in the case in which the flat-surface part of the polygonal attachment part 76 is placed in the lower side and in the case in which the ridge part is placed in the lower side.

Fifth Embodiment

Figure 13A:
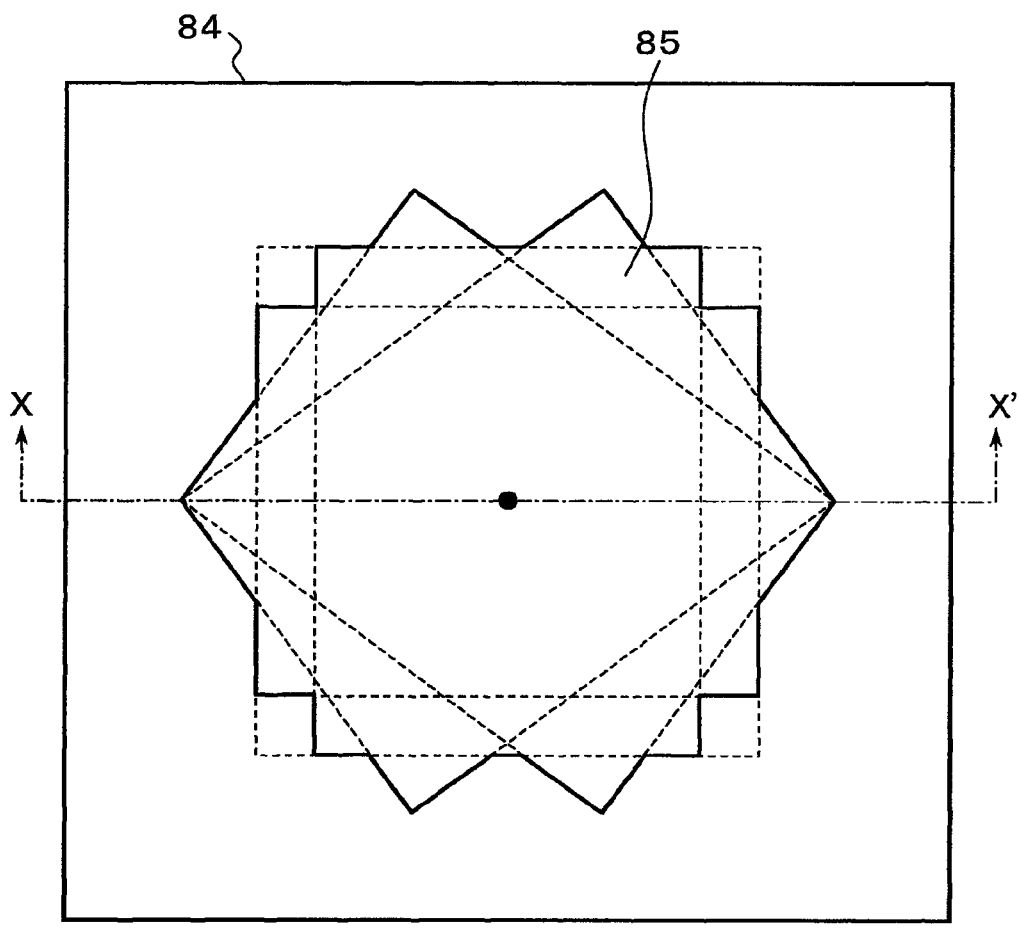
FIGS. 13A and 13B are drawings showing the installation base, wherein the angle to place a flat-surface part of the auxiliary device for full-circle panoramic video imaging is changed.
Figure 13B:
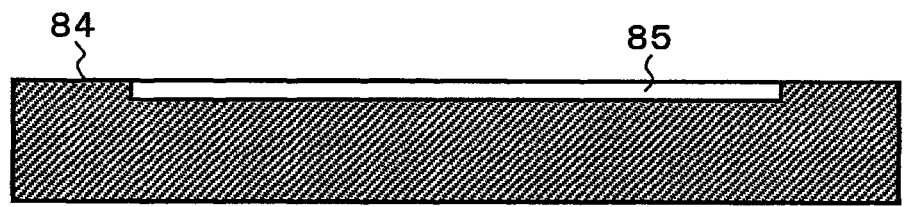

FIGS. 13A and 13B show a support base 84, which supports the installation base 80 shown in the fourth embodiment so that the horizontal angle of the installation base can be changed. FIG. 13A is a plan view, and FIG. 13B is an X-X' cross sectional view of the plan view. Generally, the installation base is mounted on a mount provided on a tripod, and the horizontal angle thereof is changed by rotating the mount; however, the support base 84 of FIGS. 13A and 10B realize that by a simple method. The support base 84 is provided with a recessed part 85, which can fit the outer shape of the installation base 80, and the shape of the recessed part is determined so that the installation base 80 can be directed in a plurality of directions.

The example shown in FIGS. 13A and 13B shows the case in which the installation base 80 can be placed at the part of broken lines and can be replaced in six directions. As a matter of course, an arbitrary number of the positions for placement can be set, and the recessed part 85 is set so that the installation base 80 is rotated about the vertical axis at which the nodal point 14 of the camera 10 is positioned.

Figure 14:
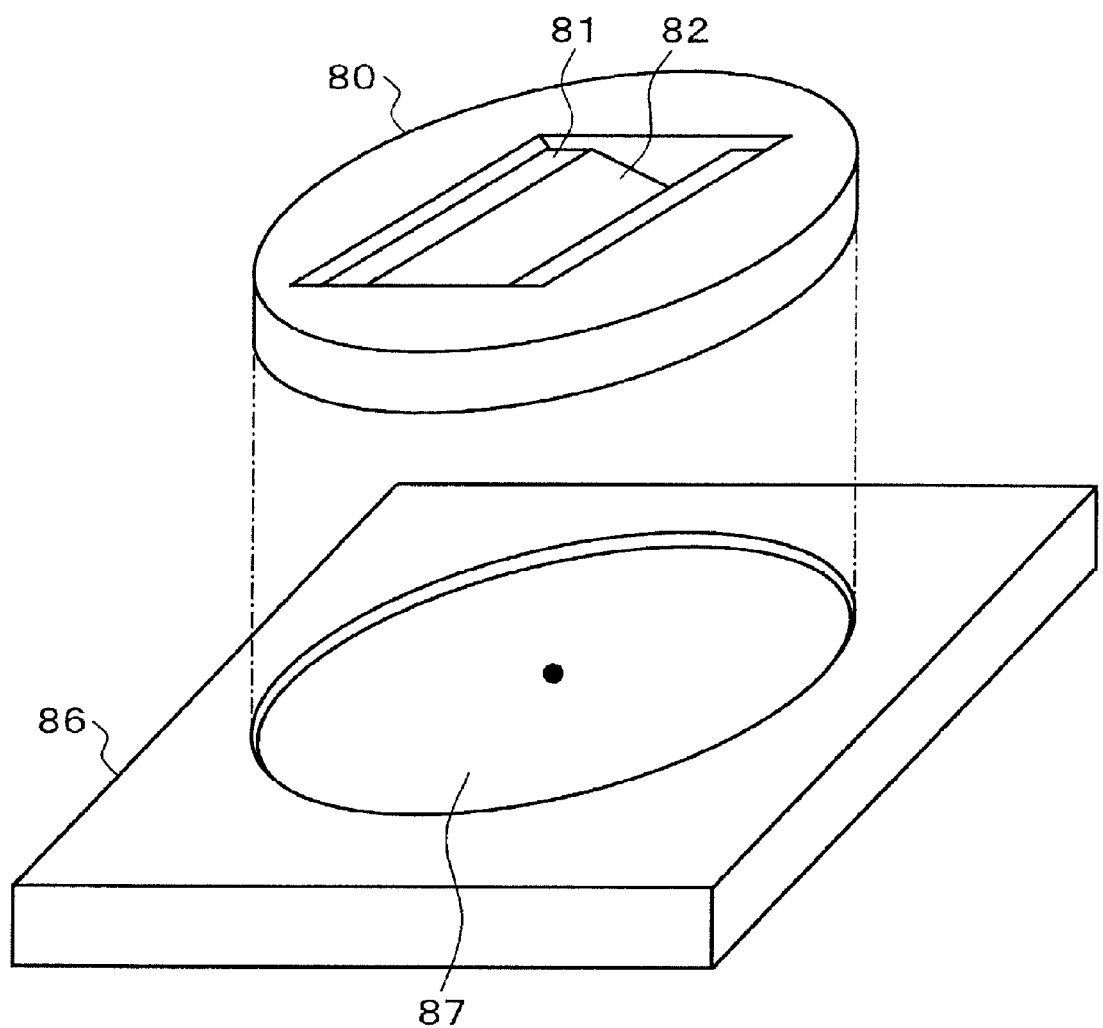
FIG. 14 is a drawing in which an installation base has a circular outer shape and is provided with a support base.

In FIG. 14, the installation base 80 has a circular outer shape and is provided with a flat-surface recessed part 81, which is an installation surface of the flat-surface part of the polygonal attachment part 76, and the V-shaped recessed part 82, on which the ridge part is to be installed. A support base 86 is provided with a circular recessed part 87 corresponding to the outer shape of the installation base 80. The nodal point 14 of the camera 10 is set on the central axis of the installation base. Therefore, the installation base 80 can be directed in an arbitrary horizontal angle above the support base 86, and images can be taken at the arbitrary horizontal angles.

Sixth Embodiment

Figure 15A:
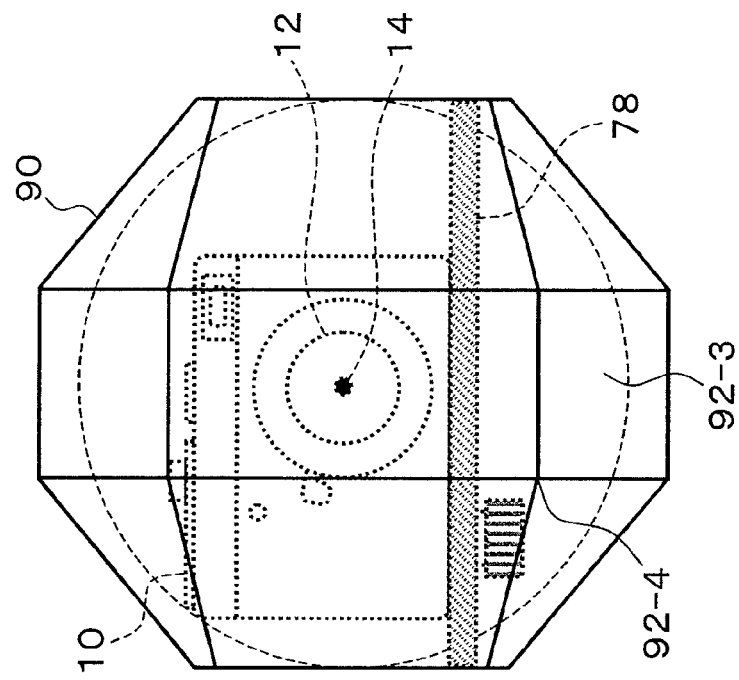
FIGS. 15A and 15B are drawings showing an auxiliary device for full-circle panoramic video imaging, wherein an attachment part has many flat-surface parts.
Figure 15B:
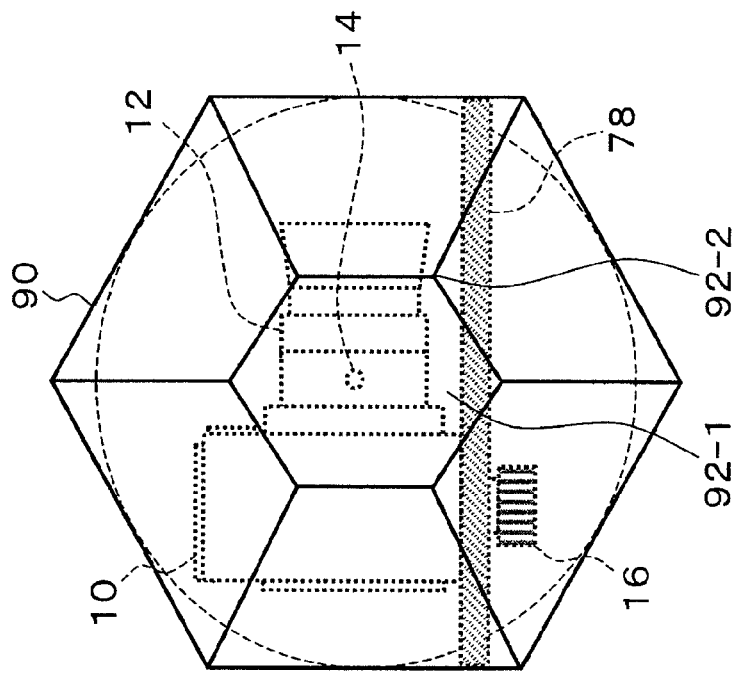

FIGS. 15A and 15B show a polyhedral attachment part 90, in which flat-surface parts in contact with the surface of the virtual spherical surface centered on the nodal point 14 are further provided on a lateral surface of the polygonal attachment part 76 of the fourth embodiment. FIG. 15A is a side view of the polyhedral attachment part 90 in the case in which the camera 10 is installed, and FIG. 15B is a front view. In the embodiment, a regular-hexagonal flat-surface part 92-1 is provided on the lateral surface of the polyhedral attachment part 90. At a corner part 92-2 of the regular-hexagonal flat-surface part 92-1, three ridges are configured to intersect mutually. At a corner part 92-4 of a tetragonal flat-surface part 92-3, four ridges are configured to intersect mutually. In this manner, flat surfaces in contact with the virtual spherical surface centered on the nodal point 14 can be arbitrarily provided, and an arbitrary number of flat surfaces can be set depending on the image-taking direction of the camera.

As a matter of course, the flat surfaces are not required to be mutually connected by sides, but may be independent flat surfaces.

Figure 16A:
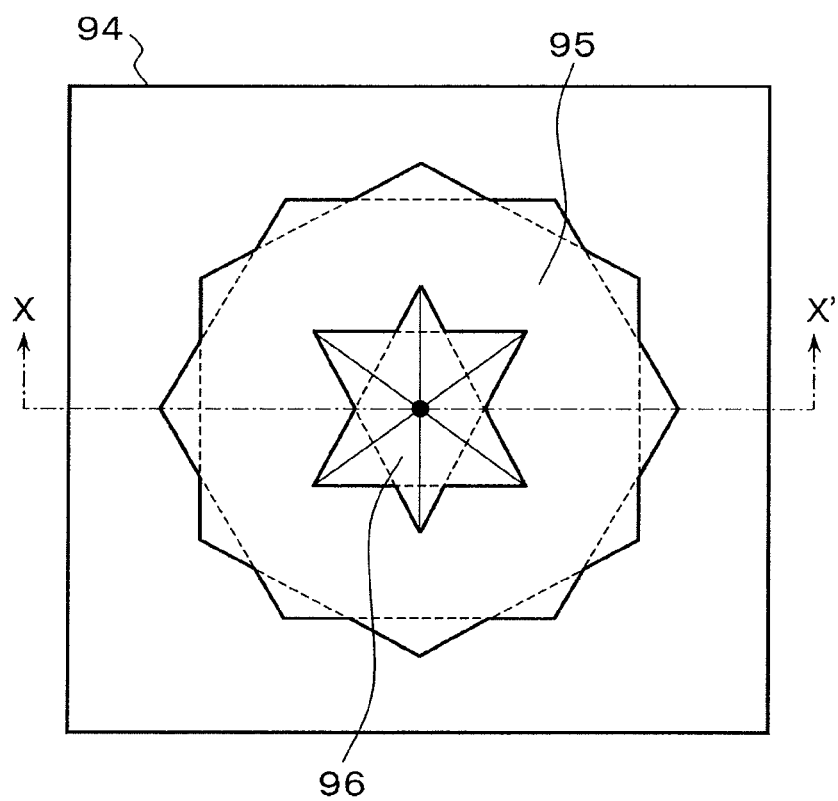
FIGS. 16A and 16B are drawings of an installation base on which a flat-surface part and a triangular corner part of a regular hexagonal shape of an attachment part can be installed while changing the horizontal angle thereof.
Figure 16B:
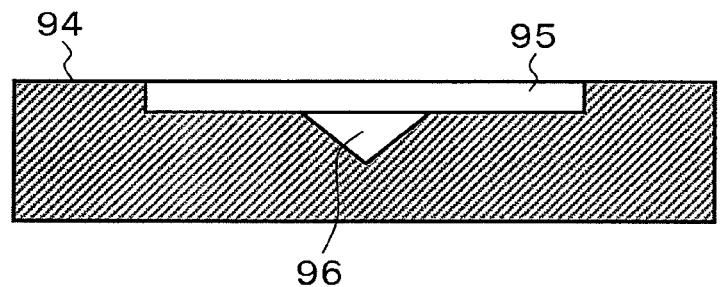

FIGS. 16A and 16B show an installation base 94 corresponding to the polyhedral attachment part 90. FIG. 16A is a plan view of the installation base 94, and FIG. 16B is an X-X' cross sectional view of the plan view. The example shown in FIGS. 16A and 16B is configured so that the flat-surface part 92-1 and the corner parts 92-2 of the regular hexagonal shape of the polyhedral attachment part 90 can be placed. The flat-surface part 92-1 is placed by using a recessed part 95 as a reference, and the corner part 92-2 is placed by using a recessed part 96 as a reference. In FIGS. 16A and 16B, the flat-surface part 92-1 can be placed in 12 directions, and the corner part 92-2 can be placed in 6 directions.

In the case in which the corner part 92-2 is placed, the depth is adjusted so that the nodal point 14 is at the same position as the case in which the flat-surface part 92-1 is placed. Moreover, the recessed parts have the shapes, wherein, even when the attachment part is placed at a changed horizontal angle, the polyhedral attachment part 90 is rotated about the central axis of the nodal point 14 so that the position of the nodal point 14 is not changed.

Figure 17A:
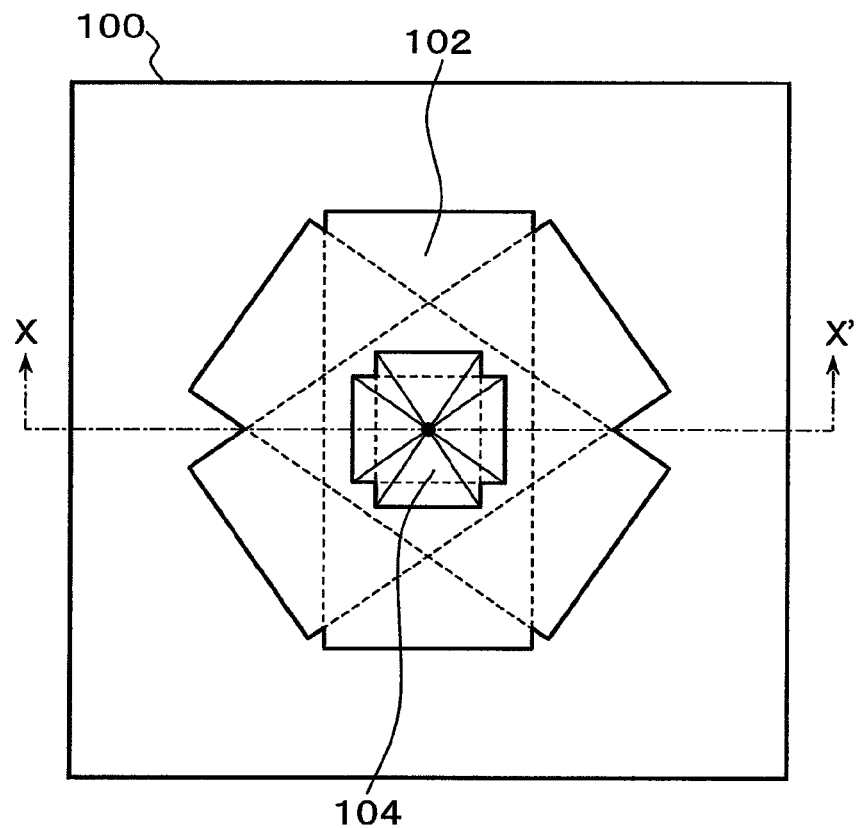
FIGS. 17A and 17B are drawings of an installation base on which a flat-surface part and a tetragonal corner part of a regular tetragonal shape of an attachment part can be installed while changing the horizontal angle thereof.
Figure 17B:
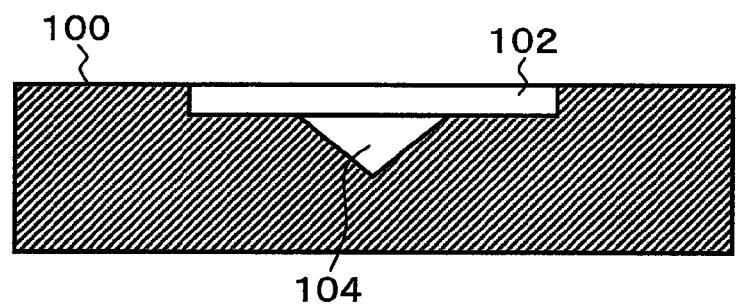

FIGS. 17A and 17B show an installation base 100 corresponding to the polyhedral attachment part 90. FIG. 17A is a plan view of the installation base 100, and FIG. 17B is an X-X' cross sectional view of the plan view. In the example shown in FIGS. 17A and 17B, a flat-surface part 92-3 and a corner part 92-4 of a regular tetragon of the polyhedral attachment part 90 can be placed. The flat-surface part 92-3 can be placed by using a recessed part 102 as a reference, and the corner part 92-4 can be placed by using a recessed part 104 as a reference. In FIGS. 17A and 17B, the flat-surface part 92-3 can be placed in six directions, and the corner part 92-4 can be placed in four directions. In the case in which the corner part 92-4 is placed, the depth is adjusted so that the nodal point is at the same position as the case in which the flat-surface part 92-3 is placed. Moreover, the recessed parts have the shapes, wherein, even when the attachment part is placed at a changed horizontal angle, the polyhedral attachment part 90 is rotated about the central axis of the nodal point 14 so that the position of the nodal point 14 is not changed. The base to be installed is not limited to those of the cases shown in FIGS. 16A, 16B, 17A and 17B; recessed parts of arbitrary combinations of flat-surface parts, ridge parts, and corner parts can be provided; and, furthermore, a plurality of angles can be arbitrarily set. In such various combinations, the depths of the recessed parts are adjusted; as a result, the camera 10 can be installed without changing the position of the nodal point 14 in all of the cases.

Seventh Embodiment

Figure 18B:
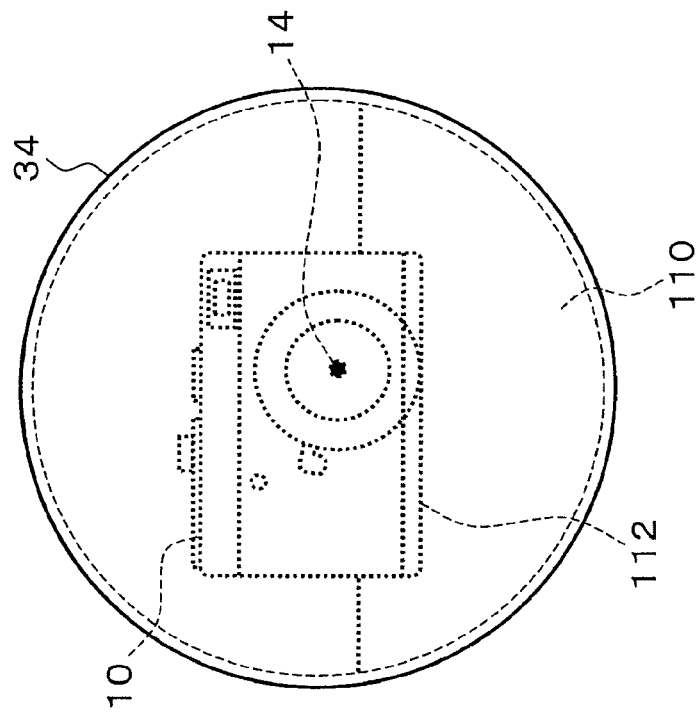
FIGS. 18A and 18B are drawings showing a camera retaining part provided with a frame of part of the camera in order to cause the camera to fit the spherical attachment part.
Figure 18A:
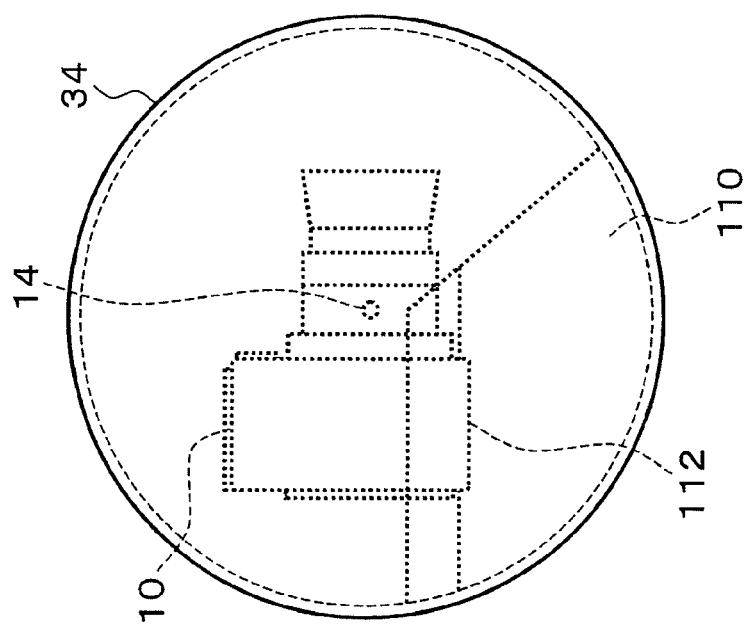

FIGS. 18A and 18B show an embodiment of an auxiliary device for full-circle panoramic video imaging, wherein a dedicated camera retaining part 110 for the camera 10 is embedded in the spherical attachment part 34. The camera retaining part 110 is provided with a frame 112 of a lower end part of the camera 10. When the camera 10 fits in the dedicated retaining part 110, the nodal point 14 is set at the center point of the spherical attachment part 34. The auxiliary device serves as a dedicated auxiliary device for full-circle panoramic video imaging for each camera 10.

FIGS. 19A and 19B show an embodiment of an auxiliary device for full-circle panoramic video imaging, wherein a dedicated camera retaining part 114 is embedded in the polygonal attachment part 76. As well as FIGS. 18A and 18B, the camera retaining part 114 is provided with a frame 116 of a lower end part of the camera 10. When the camera 10 fits in the dedicated retaining part 114, the nodal point 14 is set at the center point of the polygonal attachment part 76. The auxiliary device serves as a dedicated auxiliary device for full-circle panoramic video imaging for each camera 10.

Eighth Embodiment

Figure 20A:
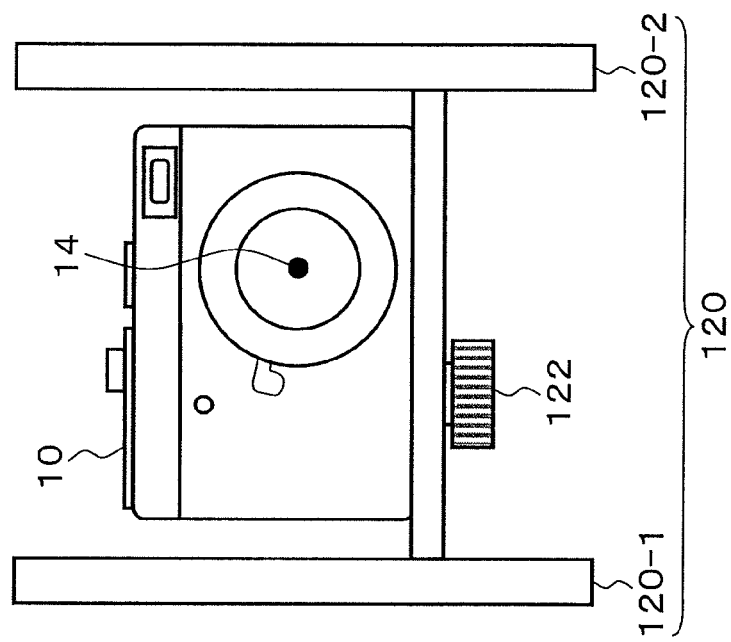
FIGS. 20A and 20B are drawings of camera retaining lateral plates for rotating the camera while fixing the nodal point by the lateral plates in both sides of the camera.
Figure 20B:
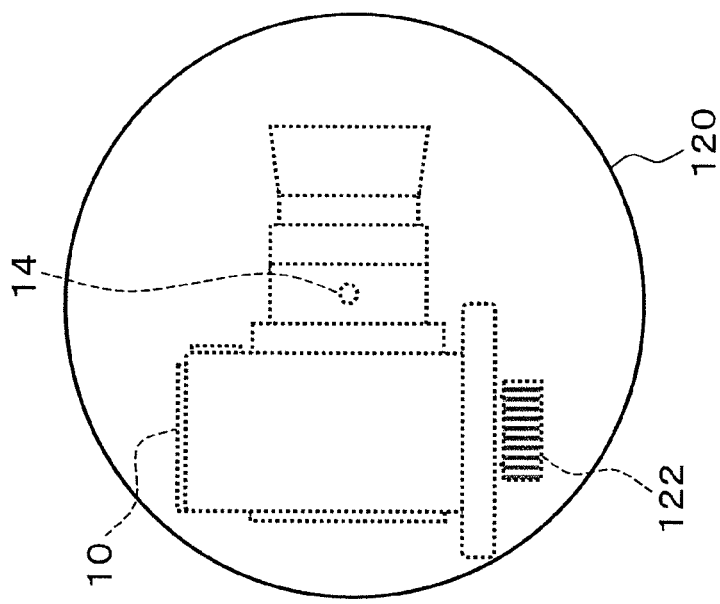

FIGS. 20A and 20B show an auxiliary device for full-circle panoramic video imaging, wherein the nodal point 14 is fixed when the camera 10 is vertically rotated, and disk-like camera retaining lateral plates 120 are provided at both lateral surfaces of the camera 10. The camera 10 is fixed by a camera retaining part 122 so that the nodal point 14 is positioned on the line connecting the center points of camera retaining lateral plates 120-1 and 120-2 positioned in both sides of the disk-like camera retaining lateral plates 120.

Figure 21:
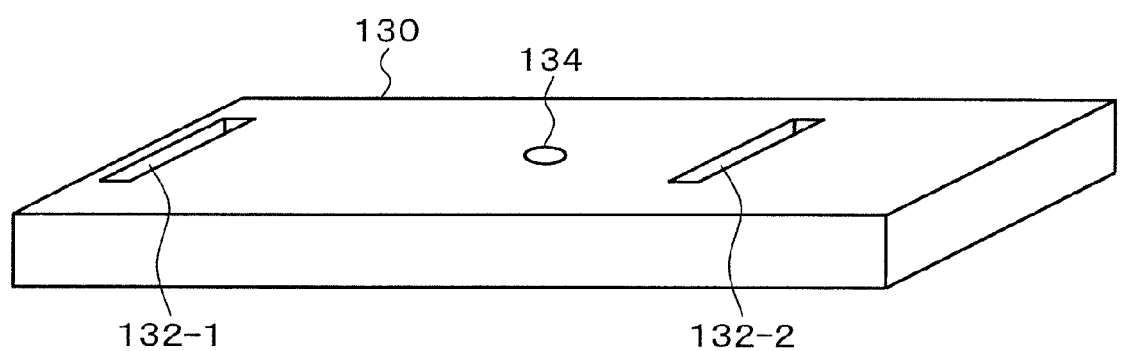
FIG. 21 is a drawing showing an installation base of the camera retaining lateral plates.
Figure 22:
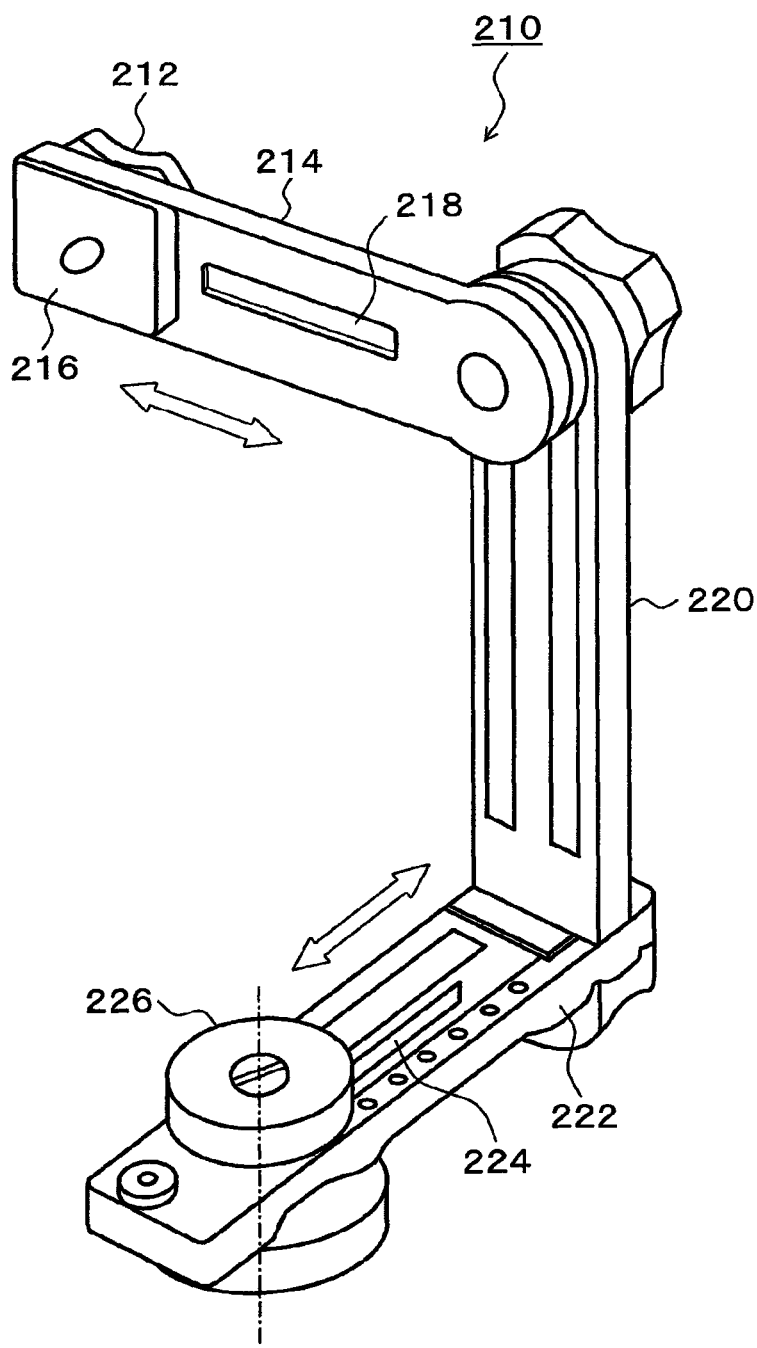
FIG. 22 is a drawing showing a conventional nodal-point adjustment device.
Figure 23A:
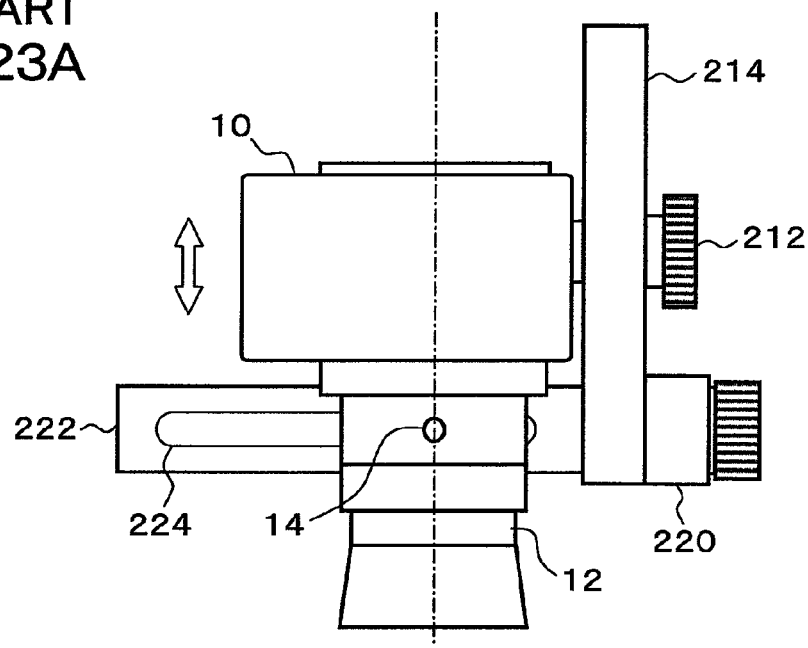
FIGS. 23A and 23B are drawings of the case in which a nodal point of a camera is adjusted by the conventional nodal-point adjustment device.
Figure 23B:
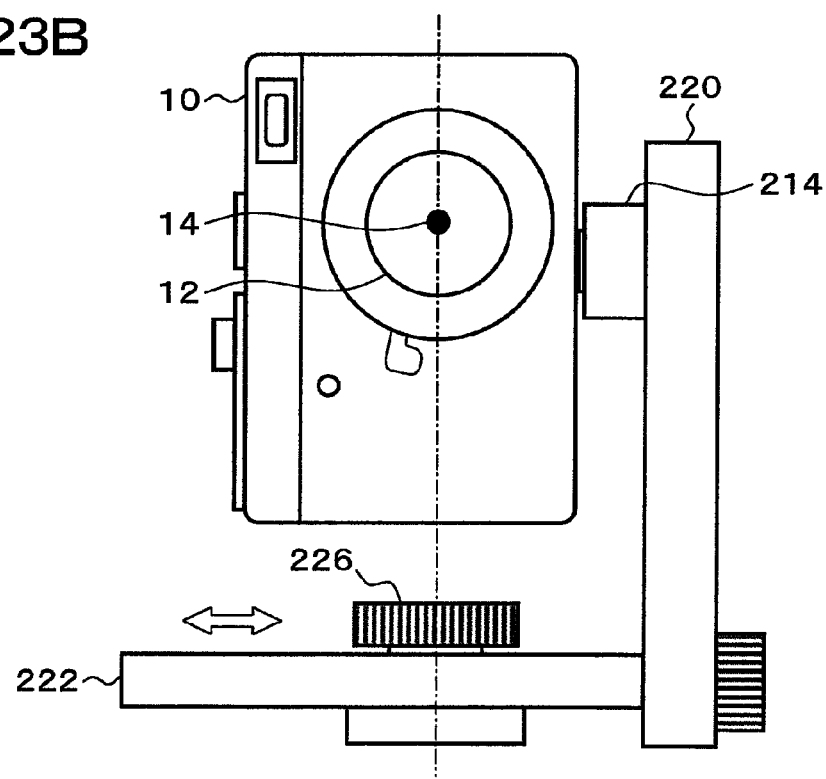

FIG. 21 shows an installation base of the auxiliary device for full-circle panoramic video imaging, wherein the disk-like camera retaining lateral plates 120 are provided at the both lateral surfaces. Camera-retaining lateral-plate receivers 132-1 and 132-2 are provided, the disk-like camera retaining lateral plates 120 are placed thereon, and a rotation-shaft insertion part 134 is configured to match the nodal point of the camera in the vertical direction. The camera retaining lateral plates 120-1 and 120-2 of the auxiliary device for full-circle panoramic video imaging shown in FIGS. 20A and 20B are placed on the camera-retaining lateral-plate receivers 132-1 and 132-2 of the installation base 130 shown in FIG. 21, and images are taken while rotating the camera retaining lateral plates 120-1 and 120-2; as a result, parallax-free images can be taken since the nodal point 14 is free from displacement and is fixed.

When the installation base 130 is rotated with a rotation shaft (not shown) being inserted in the rotation-shaft insertion part 134, the camera can be rotated without horizontal displacement of the nodal point 14. The camera retaining lateral plates 120 are not required to have disk-like shapes. The sides thereof may have a polygonal shape at a fixed distance from the nodal point. In that case, the camera-retaining lateral-plates receivers 132-1 and 132-2 have the shapes capable of receiving the sides. Alternatively, the nodal point 14 is configured to have a fixed distance from the corner parts of the polygonal shape, and the camera-retaining lateral-plate receivers 132-1 and 132-2 may have the shapes capable of receiving the corner parts. The embodiments of the present invention have been described above. The present invention includes arbitrary modifications which do not impair the objects and advantages thereof. Furthermore, the present invention is not limited by the above described embodiments.

The invention claimed is:

1. An auxiliary device for full-circle panoramic video imaging, the auxiliary device comprising:
    a retaining part of a camera body;
    the retaining part provided with one or a plurality of camera attachment part on an equidistant surface centered on a nodal point of a camera, each camera attachment part having a rotation function; wherein,
    when the camera attachment part is attached to the camera support mechanism, the nodal point of the camera is positioned on an axis of rotation of a rotation part provided in the camera support mechanism; and
    the camera attachment part is a plurality of flat surfaces in contact with a virtual spherical surface centered on the nodal point of the camera,
    an installation base provided with a recessed part so that, when the auxiliary device for full-circle panoramic video imaging having the attachment part having the shape of the flat surfaces is mounted on the camera support part, the nodal point of the camera matches the axis of rotation even when any flat-surface part of a plurality of flat-surface parts is attached to the camera support part.

2. The auxiliary device for full-circle panoramic video imaging according to claim 1, comprising
    an installation base having a recessed part so that, when the auxiliary device for full-circle panoramic video imaging having the attachment part having the shape of the flat surfaces is mounted on the camera support part, the nodal point of the camera matches the axis of rotation even when the auxiliary device is attached to the camera support part while a ridge or a corner part at which a plurality of flat-surface parts are intersecting is in a lower side.

3. The auxiliary device for full-circle panoramic video imaging according to claim 1, comprising
    an installation base having two recessed parts so that, when the auxiliary device for full-circle panoramic video imaging having the attachment part having the shape of the flat surfaces is mounted on the camera support part, the nodal point of the camera matches the axis of rotation and at a same height in both of: a case in which the auxiliary device is attached to the camera support part while the plurality of flat-surface parts are in the lower side and a case in which the auxiliary device is attached to the camera support part while a ridge or a corner part at which sides of the flat-surface parts are intersecting is in the lower side.

4. The auxiliary device for full-circle panoramic video imaging according to claim 1, comprising
    a support base supporting the installation base so that a horizontal direction can be changed without changing the nodal point.

5. The auxiliary device for full-circle panoramic video imaging according to claim 4, wherein
    the installation base has a circular outer shape centered on a vertical axis of the nodal point; and
    the support base is provided with a circular groove having an approximately same diameter as the outer shape of the installation base, the groove being provided on an upper flat surface.

6. The auxiliary device for full-circle panoramic video imaging according to claim 1, wherein
    a recessed part provided in the installation base for placing a flat-surface part, a ridge part, or a corner part is provided with a plurality of recessed parts so that the direction in a horizontal direction can be changed without changing the position of the nodal point.

7. The auxiliary device for full-circle panoramic video imaging according to claim 6, wherein
    the recessed parts are formed in the installation base so that the position of the nodal point is not changed even when the recessed parts are provided by a combination of the flat-surface part and the ridge part, the flat-surface part and the corner part, the ridge part and the corner part, or the flat-surface part, the ridge part, and the corner part.

8. An auxiliary device for full-circle panoramic video imaging comprising:
    a retaining part of a camera body;
    the retaining part provided with a plurality of camera attachment parts on an equidistant surface centered on a nodal point of a camera, each camera attachment part having a rotation function; wherein, when the camera attachment part is attached to the camera support mechanism, the nodal point of the camera is positioned on an axis of rotation of a rotation part provided in the camera support mechanism; and
    the camera attachment part has a camera retaining lateral plate providing camera retaining lateral plates at both lateral surfaces of a camera and retaining the camera by a camera retaining part setting a nodal point of the camera on a line connecting rotation center points of the lateral plates; and
    an installation base having a recessed part for positioning the camera retaining lateral plate, the installation base rotating about a vertical line of the nodal point of the camera.

9. The auxiliary device for full-circle panoramic video imaging according to claim 8, wherein
    the camera retaining lateral plate has a disk-like shape.

10. The auxiliary device for full-circle panoramic video imaging according to claim 8, wherein
    the camera retaining lateral plate has a polygonal shape, and the center of rotation is a point having a fixed distance from a side or corner of the polygonal shape.

* * * * *